United States Patent
Gaurav et al.

(10) Patent No.: US 9,619,261 B2
(45) Date of Patent: Apr. 11, 2017

(54) METHOD AND SYSTEM FOR ANTICIPATING DEMAND FOR A COMPUTATIONAL RESOURCE BY CONTAINERS RUNNING ABOVE GUEST OPERATING SYSTEMS WITHIN A DISTRIBUTED, VIRTUALIZED COMPUTER SYSTEM

(71) Applicant: VMWARE, INC., Palo Alto, CA (US)

(72) Inventors: Kumar Gaurav, Bangalore (IN); Rajdeep Dua, Bangalore (IN); Vaibhav Kohli, Bangalore (IN); Anil Kumar, Pune (IN); Shruti Sharma, Bangalore (IN); Nupur Agrawal, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/879,141

(22) Filed: Oct. 9, 2015

(65) Prior Publication Data
US 2016/0378519 A1 Dec. 29, 2016

(30) Foreign Application Priority Data

Jun. 29, 2015 (IN) .......................... 3318/CHE/2015

(51) Int. Cl.
*G06F 9/455* (2006.01)
*G06F 9/50* (2006.01)

(52) U.S. Cl.
CPC ...... *G06F 9/45545* (2013.01); *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS 8,423,998 B2 * 4/2013 Isci .................. G06F 9/5077
717/176
8,732,291 B2 * 5/2014 Zhu .................. H04L 67/303
709/217

(Continued)

OTHER PUBLICATIONS

Weng et al. "Hybrid CPU Management for Adapting to the Diversity of Virtual Machines", 2013 IEEE, pp. 1333-1344.*

(Continued)

*Primary Examiner* — Van Nguyen

(57) ABSTRACT

The current document is directed to methods and systems for efficiently executing OSL-virtualization containers within the execution environments provided by virtual machines that execute above traditional virtualization layers within large, virtualized, distributed computing systems. The currently disclosed methods and systems anticipate the need for additional virtual machines in order to meet anticipated demands for one or more computational resources by the containers. In addition, the methods and systems provision and launch virtual machines with computational-resource allocations that minimize overhead and computational-resource wastage. In one implementation, computational-resource utilization of ATMs and containers within the virtualized, distributed computer system are periodically monitored in order to estimate future demand for the computational resource and, when necessary, to launch additional virtual machines to meet the estimated future demand for the computational resource.

20 Claims, 32 Drawing Sheets

(56) References Cited

U.S. PATENT DOCUMENTS

| | | | | |
|---|---|---|---|---|
| 8,826,277 | B2* | 9/2014 | Chang | G06F 9/45545 |
| | | | | 707/602 |
| 9,027,024 | B2* | 5/2015 | Mick | H04L 43/0817 |
| | | | | 709/224 |
| 9,081,621 | B2* | 7/2015 | Fahrig | G06F 9/5077 |
| 9,135,189 | B2* | 9/2015 | Chakraborty | G06F 13/14 |
| 9,170,835 | B2* | 10/2015 | Ling | G06F 9/45558 |
| 9,304,803 | B2* | 4/2016 | Nelson | G06F 9/45558 |
| 9,348,632 | B2* | 5/2016 | Ge | G06F 9/5077 |
| 9,378,044 | B1* | 6/2016 | Gaurav | G06F 9/5077 |
| 2014/0207425 | A1* | 7/2014 | Yeung | G06F 17/5009 |
| | | | | 703/2 |
| 2016/0147553 | A1* | 5/2016 | Palavalli | G06F 21/121 |
| | | | | 718/1 |

OTHER PUBLICATIONS

Weng et al. "The Hybrid Scheduling Framework for Virtual Machine Systems", 2009 ACM, pp. 111-120.*

Santors et al. "A Hybrid Framework for Supporting Scheduling in Extended Manufacturing Environments", 2014 IEEE, pp. 213-218.*

* cited by examiner

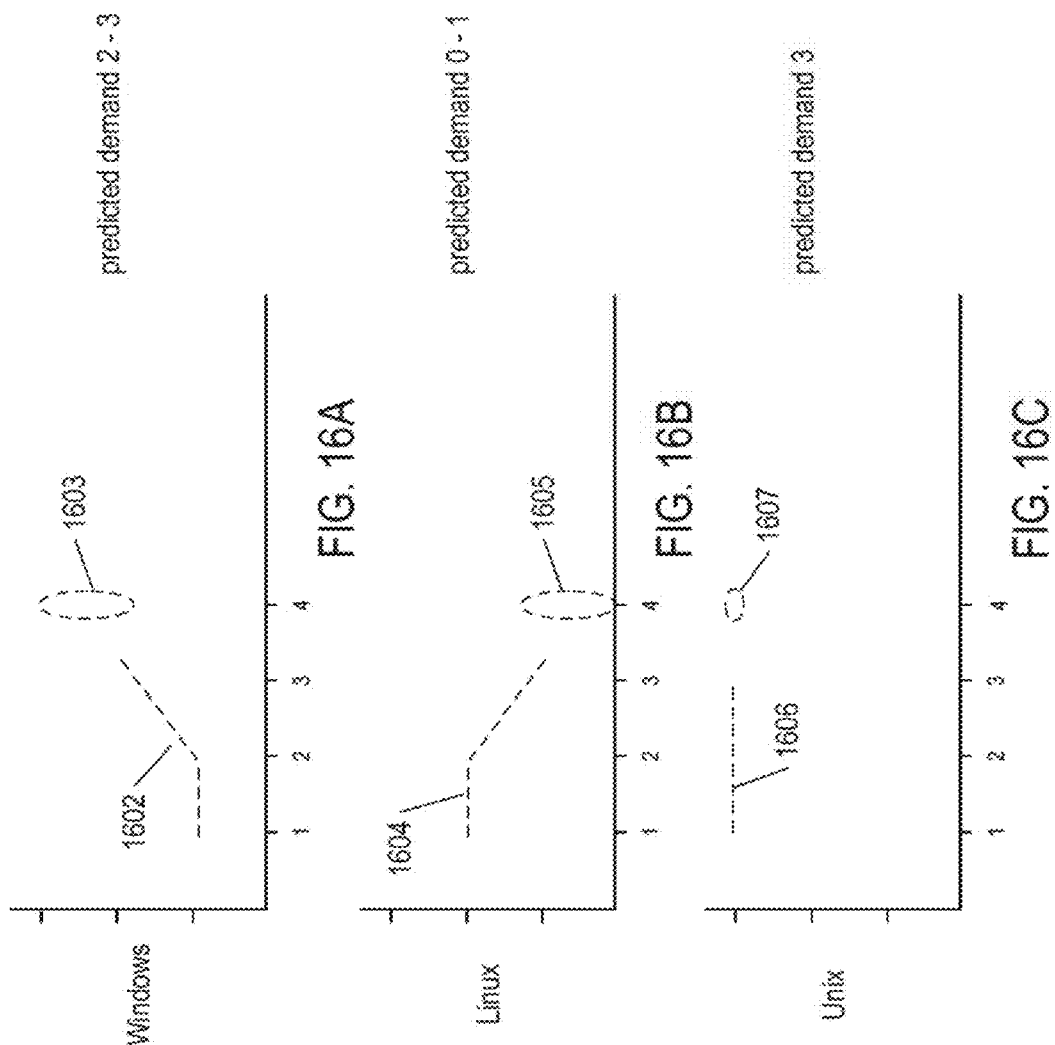

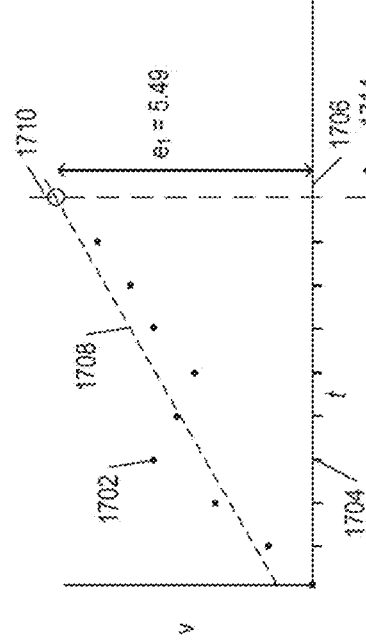
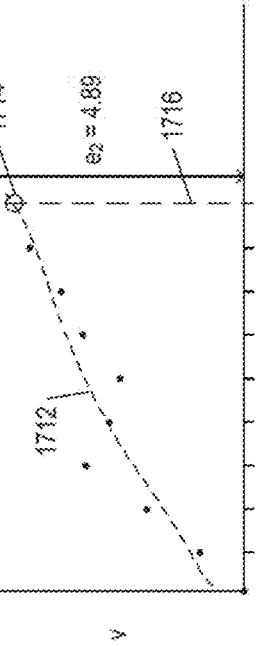
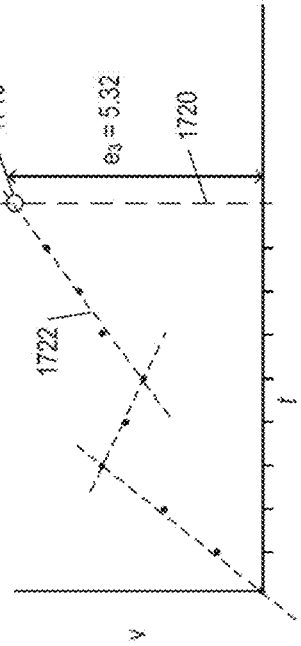
FIG. 17A
FIG. 17B
FIG. 17C

```
const int n = 5;
const int monitoring_period = 1;
const int interval_length = 24;                    ⎫
const double demand_threshold = 0.9;               ⎬ 1902
const long min_VM = 2;                             ⎪
const long max_VM = 16;                            ⎭
                                            1903
enum OS {Linux, Unix, Windows, OSx};
                              1904
typedef long time;
                  1905
void wait(time);
                                              1906
double extrapolate(long* data, int numDataPoints);

typedef struct                          ⎫
{                                       ⎬ 1907
      long memUtilized;                 ⎪
      time start;                       ⎭
} Ct;

class Container                                    ⎫
{                                                  ⎪
   public:                                         ⎪
         bool operator==(Container c);             ⎬ 1908
         long getUtilization();                    ⎪
         time getStart();                          ⎪
         void init(long u, time s);                ⎪
         Container();                              ⎭
};

class VM                                                      ⎫
{                                                             ⎪
   public:                                                    ⎪
         bool operator==(VM v);                               ⎪
         long getUtilization();                               ⎪
         long getConfigured();                                ⎬ 1909
         Container* getFirstContainer();                      ⎪
         Container* getNextContainer();                       ⎪
         int getNumContainers();                              ⎪
         OS getOS();                                          ⎪
         void init(long u, long c, Container* cs, int numC, OS os);
         VM();                                                ⎭
};
```

FIG. 19A

```
typedef VM* VMptr;        ⎫
typedef Container* Ctptr; ⎬ 1910
                          ⎭ template<class M> class set
{
   public:
       void add(M* element);  ⎫
       M* first();            ⎪
       M* next();             ⎬ 1911
       int getNum();          ⎪
       bool in(M* element);   ⎪
       set();                 ⎭
};

class dSystem
{
   public:
       VM* getFirstVM();                              ⎫
       VM* getNextVM();                               ⎪
       void addVM(VM* vm);                            ⎪
       VM* provisionVM(double configuredMemory, OS os); ⎬ 1912
       int   launchVM(VM* v);                         ⎪
       time getCurrentTime();                         ⎪
       void beginMonitor();                           ⎪
       void endMonitor();                             ⎪
       dSystem();                                     ⎭
};
```

FIG. 19B

```
int compare (const void * a, const void * b)
{
  Ct* first = (Ct*)a;
  Ct* second = (Ct*)b;

if ( first->start <  second->start ) return -1;
  else if ( first->start == second->start ) return 0;
  else return 1;
}
```
⎫ 1913

```
double extrapolate(long* data, int numDataPoints)
{
  double diff = data[numDataPoints-1] - data[numDataPoints-2];
  double result = data[numDataPoints-1] + diff;
  if (result >= 0) return result;
  else return 0;
}
```
⎫ 1914

```
int _tmain(int argc, _TCHAR* argv[])
{
        dSystem sys;

while (true)
        {
            wait(monitoring_period);
            monitor(&sys);
        }
        return 0;
}
```
1916 ⎧ (while block) ⎫ 1915

FIG. 19C

```
void monitor(dSystem *sys)  ─── 1917
{
    set<OS> OSs;        ⎫
    set<VM> VMs[];      ⎬ 1918
    Ct sortedCts[];  ─── 1919
    VMptr v;            ⎫
    Ctptr c;            ⎬ 1920
    OS *os;             ⎫
    OS o;               ⎬ 1921 int numContainers;  ─── 1922 long totalUtilization;  ⎫
    long totalConfigured;   ⎬ 1923 time currentTime;   ⎫
    time earliestTime;  ⎬ 1924
    time nextTime;      ⎭ long MbyInterval[n];  ─── 1925
    int mStart = 0;       ─── 1926
    int i, j;             ─── 1927 double predictedDemand;  ⎫
    double available;        ⎬ 1928
    double VM_size;          ⎭
```

FIG. 19D

```
sys->beginMonitor();  ── 1929 currentTime = sys->getCurrentTime();  ── 1930
earliestTime = currentTime - (n * interval_length);  ── 1931 v = sys->getFirstVM();
while (v != NULL)
{
    o = v->getOS();           ⎫
    OSs.add(&o);              ⎬ 1932
    VMs[o].add(v);            ⎪
    v = sys->getNextVM();     ⎭
} os = OSs.first();  ── 1933
while (os != NULL)        // Main Loop Start  ── 1934
{
    o = *os;  ── 1935
    os = OSs.next();  ── 1936
    totalUtilization = 0;     ⎫
    totalConfigured = 0;      ⎬ 1937
    numContainers = 0;        ⎪
    mStart = 0;               ⎭ v = VMs[o].first();  ── 1938
    while (v != NULL)
    {
        totalUtilization += v->getUtilization();
        totalConfigured += v->getConfigured();
        c = v->getFirstContainer();
        while (c != NULL)
        {
            if (c->getStart() >= earliestTime)
            {                                                             ⎫
                sortedCts[numContainers].start = c->getStart();           ⎬ 1939
                sortedCts[numContainers++].memUtilized = c->getUtilization();
            }
            c = v->getNextContainer();
        }
        v = VMs[o].next();
    }
```

FIG. 19E

```
if (numContainers == 0) continue;  ─── 1940
else
{
    qsort((void*)&(sortedCts[0]), numContainers, sizeof(Ct), compare);  ─── 1941
    nextTime = earliestTime + interval_length;  ──────── 1942
    while (sortedCts[0].start > nextTime)
    {
        mStart++;                                     } 1943
        nextTime += interval_length;
    }
    j = 0;  ─── 1944
    for (i = 0; i < n; i++)
    {
        MbyInterval[i] = 0;  ─── 1946
        if (i >= mStart)
        {
            while (sortedCts[j].start <= nextTime && j < numContainers)
            {
1947        {   MbyInterval[i] += sortedCts[j].memUtilized;         } 1945
                j++;
            }
            nextTime += interval_length;
        }
1948 ─── }
    predictedDemand = extrapolate(&(MbyInterval[mStart]), n - mStart);
}
```

FIG. 19F

```
available = demand_threshold * (totalConfigured - totalUtilization);    ~ 1949
if (predictedDemand < available) continue;    ~ 1950
else
{
    predictedDemand -= available;    ~ 1951
    if (predictedDemand < min_VM)
    {
        v = sys->provisionVM(min_VM, o);  ⎫
        sys->launchVM(v);                 ⎬ 1952
    }                                     ⎭
    else
    {
        i = predictedDemand / max_VM;              ⎫
        if (i * max_VM < predictedDemand) i++;     ⎬ 1953
        VM_size = (predictedDemand / i);           ⎫
        if (VM_size * i < predictedDemand) VM_size++;  ⎬ 1954
        while (predictedDemand > 0)
        {
            v = sys->provisionVM(VM_size, o);  ⎫
            sys->launchVM(v);                  ⎬ 1955
            predictedDemand -= VM_size;        ⎭
        }
    }
}
}        //End Main Loop
sys->endMonitor();
}
```

FIG. 19G

METHOD AND SYSTEM FOR ANTICIPATING DEMAND FOR A COMPUTATIONAL RESOURCE BY CONTAINERS RUNNING ABOVE GUEST OPERATING SYSTEMS WITHIN A DISTRIBUTED, VIRTUALIZED COMPUTER SYSTEM

RELATED APPLICATION

Benefit is claimed under 35 U.S.C. 119(a)-(d) to Foreign application Serial No. 3318/CHE/2015 filed in India entitled "METHOD AND SYSTEM FOR ANTICIPATING DEMAND FOR A COMPUTATIONAL RESOURCE BY CONTAINERS RUNNING ABOVE GUEST OPERATING SYSTEMS WITHIN A DISTRIBUTED, VIRTUALIZED COMPUTER SYSTEM", filed on Jun. 29, 2015, by VMware, Inc., which is herein incorporated in its entirety by reference for all purposes.

TECHNICAL FIELD

The current document is directed to virtualized, distributed computer systems, such as virtualized, distributed computer systems that operate as cloud-computing facilities, and, in particular, to methods and systems for elastic scheduling of virtual machines to host containers that, in turn, provide execution environments for applications within the cloud-computing facility.

BACKGROUND

During the past 60 years, computer systems have evolved from primitive, single-processor computer systems that lacked operating systems and compilers for modern, structured programming languages to enormous, geographically distributed computer systems comprising hundreds, thousands, or more individual multi-processor computer systems, linked together with network communications and shared mass-storage facilities, concurrently running many different sophisticated applications. These large, distributed computer systems are often virtualized to provide virtual data centers and virtual-data-center aggregations that, in turn, provide for flexible and efficient system administration. Many cloud-computing facilities provide interfaces to large, virtualized, distributed computing systems that allow clients of the cloud-computing facilities to rapidly and dynamically configure virtual host systems for running client applications that can, in turn, provide computing services to thousands, millions, or more remote users. Many of the virtualization technologies employed within cloud-computing facilities involve virtualization layers that execute above the hardware layer of host computers to provide execution environments for virtual machines. The virtual machines, in turn, provide execution environments for guest operating systems, which, in turn, provide execution environments for applications. This type of virtualization technology provides enormous advantages to owners and administrators of cloud-computing facilities as well as to cloud-computing-facility clients. These virtualization technologies, as one example, can simulate any of many different types of underlying hardware and can therefore provide a virtual hardware platform on which many different types of operating systems can execute. However, the enormous flexibility provided by this type of virtualization technology is associated with certain computational overheads and costs. Another approach to virtualization is referred to as operating system-level virtualization ("OSL virtualization"). While not as flexible and powerful as the traditional virtualization technologies that provide virtualization layers to support virtual-machine execution, OSL virtualization has significantly lower computational overheads and costs, and is, for that reason, an increasingly popular choice for virtual hosting environments, such as those used to run client applications in cloud-computing facilities. Designers and developers of distributed computing systems, designers and developers of cloud-computing facilities, owners and administrators of cloud-computing facilities and other distributed computing systems, and, ultimately, users of distributed computing systems continue to seek efficient and cost-effective technologies that provide a foundation for cloud computing and other virtualized, distributed computing-systems applications.

SUMMARY

The current document is directed to methods and systems for efficiently executing OSL-virtualization containers within the execution environments provided by virtual machines that execute above traditional virtualization layers within large, virtualized, distributed computing systems. The currently disclosed methods and systems anticipate the need for additional virtual machines in order to meet anticipated demands for one or more computational resources by the containers. In addition, the methods and systems provision and launch virtual machines with computational-resource allocations that minimize overhead and computational-resource wastage. In one implementation, computational-resource utilization of VMs and containers within the virtualized, distributed computer system are periodically monitored in order to estimate future demand for the computational resource and, when necessary, to launch additional virtual machines to meet the estimated future demand for the computational resource.

BRIEF DESCRIPTION OF THE DRAWINGS

In FIG. 9, three different physical data centers 902-904 are shown below planes representing the cloud-director layer of abstraction 906-908.

FIGS. 16A-C provide an indication of how the expected demand for memory associated with containers running within particular operating systems may be estimated, using the example of FIGS. 15A-C.

FIGS. 17A-C illustrate three of many different data-point-extrapolation methods.

FIGS. 19A-G show a simple C++-like implementation of a monitor routine that monitors the hosts within a hybrid virtualized distributed computing system in order to anticipate the need for additional VMs in order to accommodate a projected demand for resources to launch new containers within the execution environments provided by VMs.

DETAILED DESCRIPTION OF EMBODIMENTS

Figure 1:
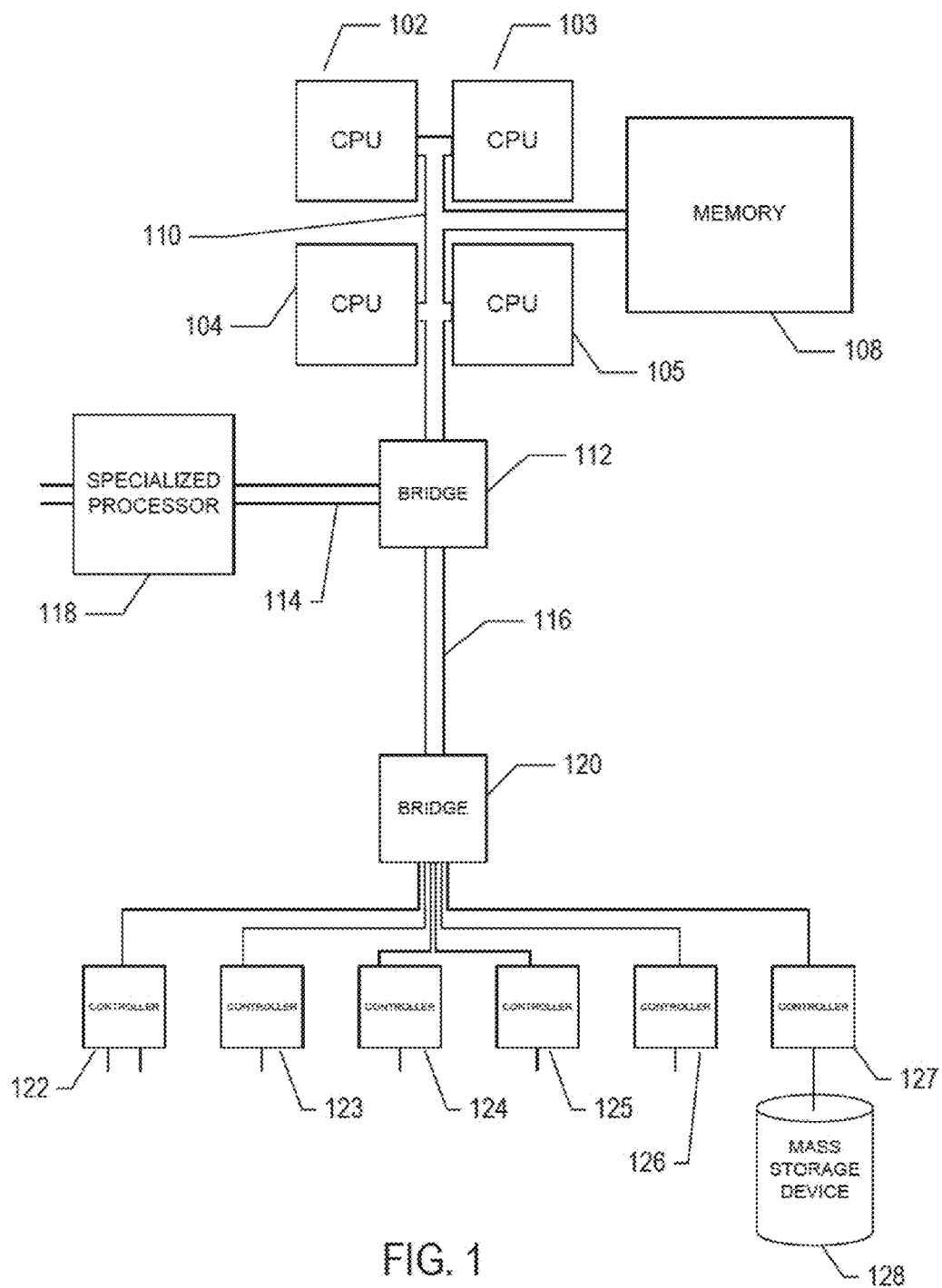
FIG. 1 provides a general architectural diagram for various types of computers.

The current document is directed to methods and systems for elastic scheduling of virtual machines within a virtualized, distributed computer system in order to provide execution environments for OSL-virtualization containers that, in turn, provide execution environments for client applications. In a first subsection, below, traditional virtualization technologies are described with reference to FIGS. 1-12. In a following subsection, contains and containers supported by virtualization layers are discussed. In a third subsection, the methods and systems for elastic scheduling of VMs in order to anticipate resource needs of containers is discussed, in detail, with reference to flow diagrams and C++ implementation.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
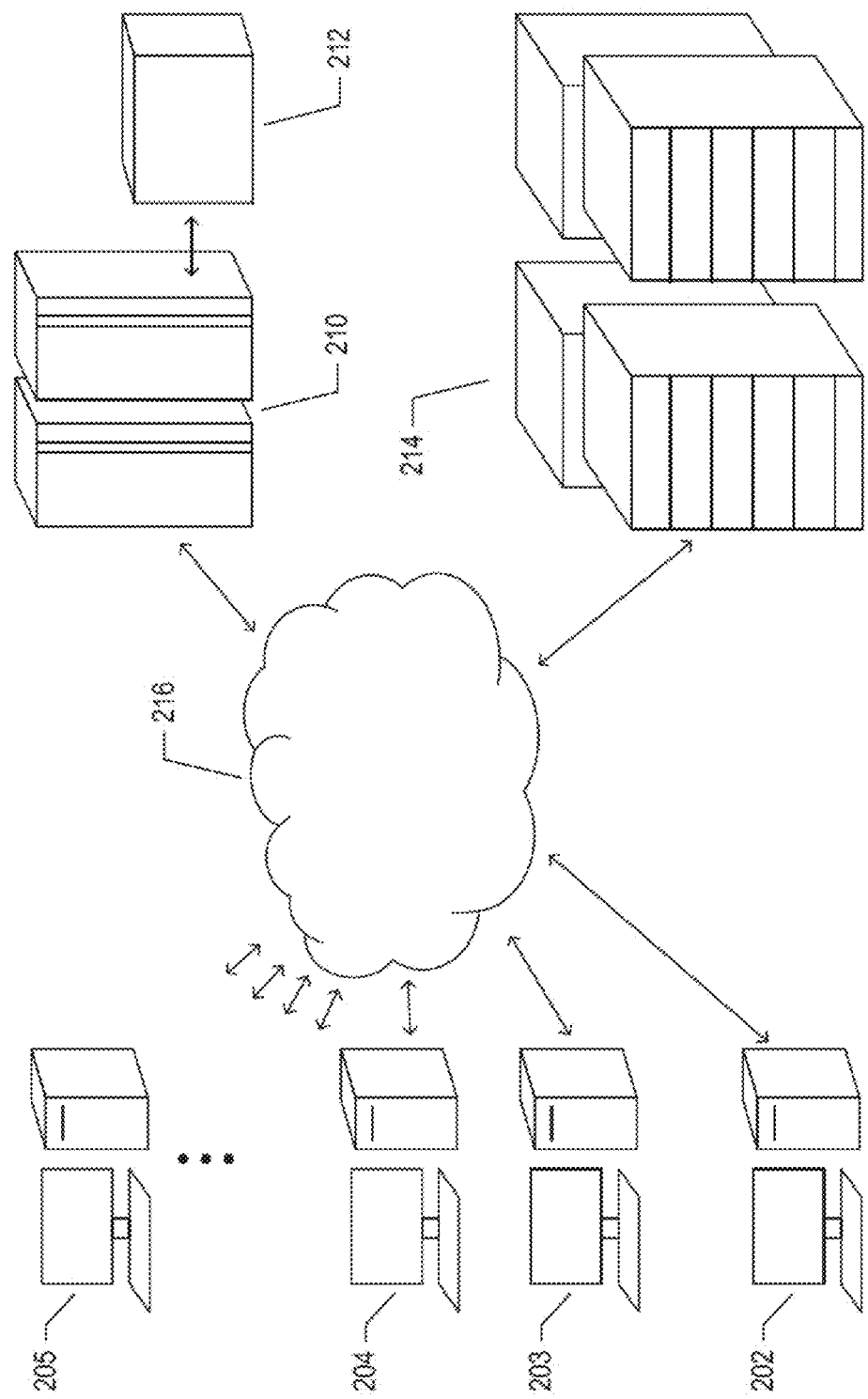
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
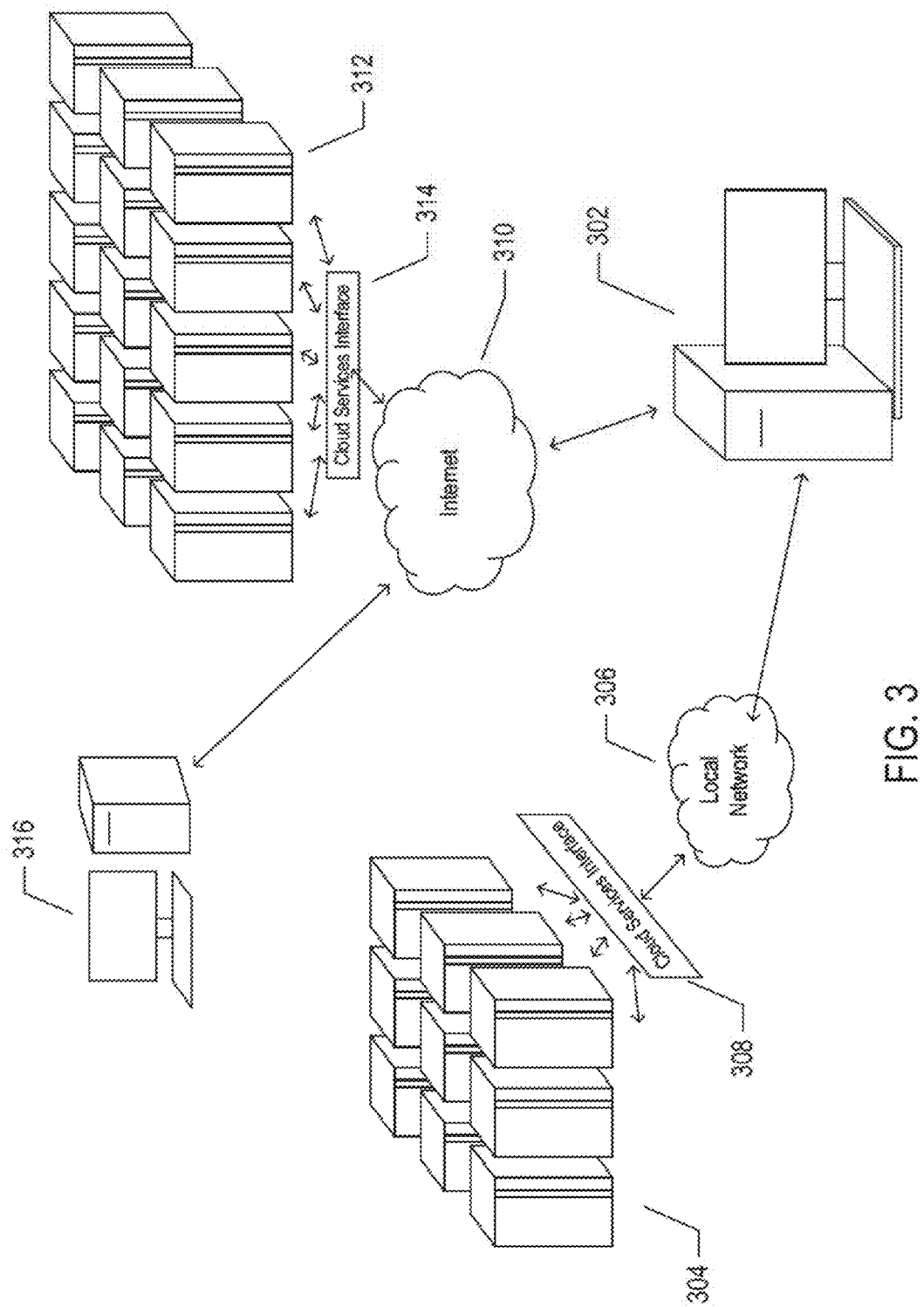
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
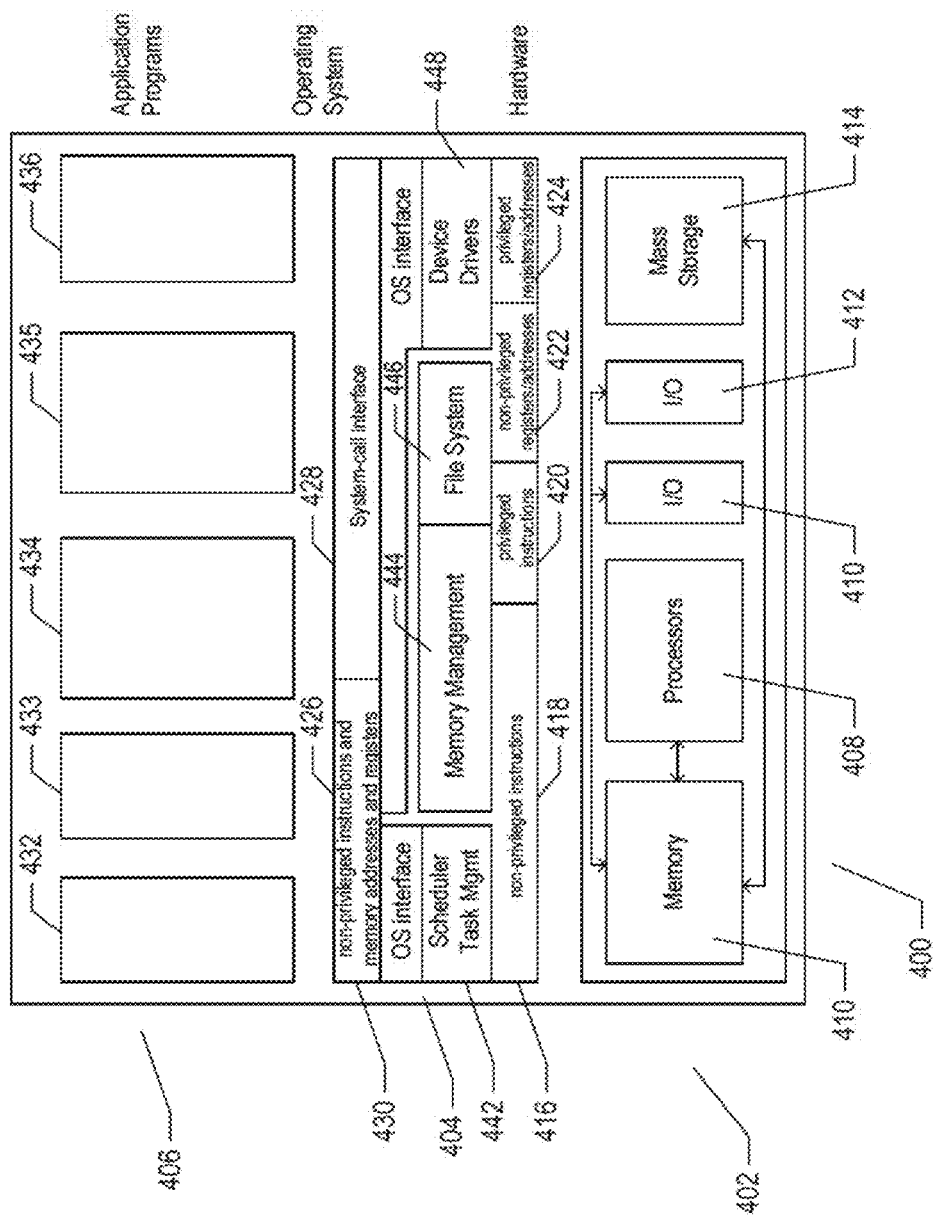
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
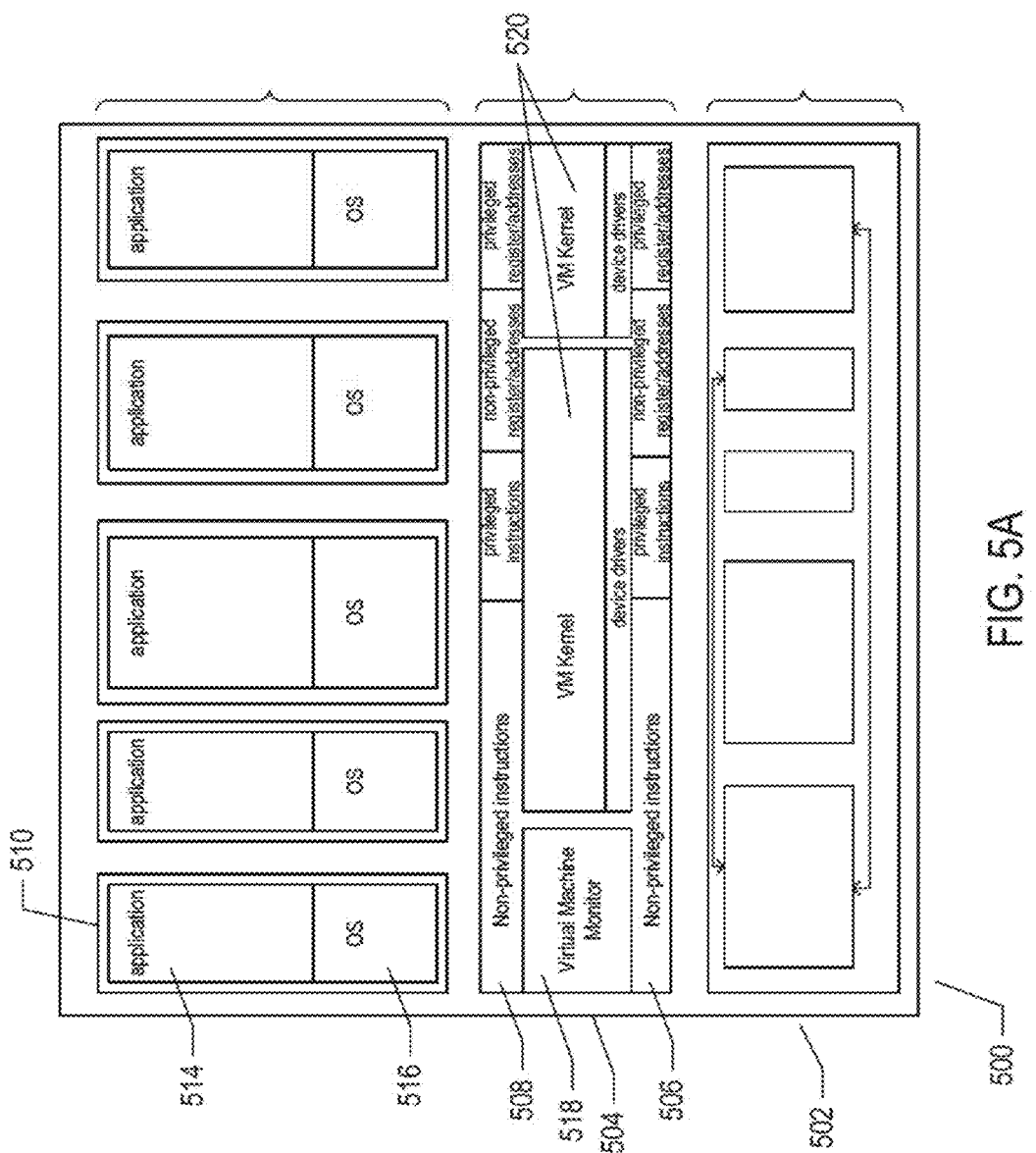
FIGS. 5A-B illustrate two types of virtual machine and virtual-machine execution environments.
Figure 5B:
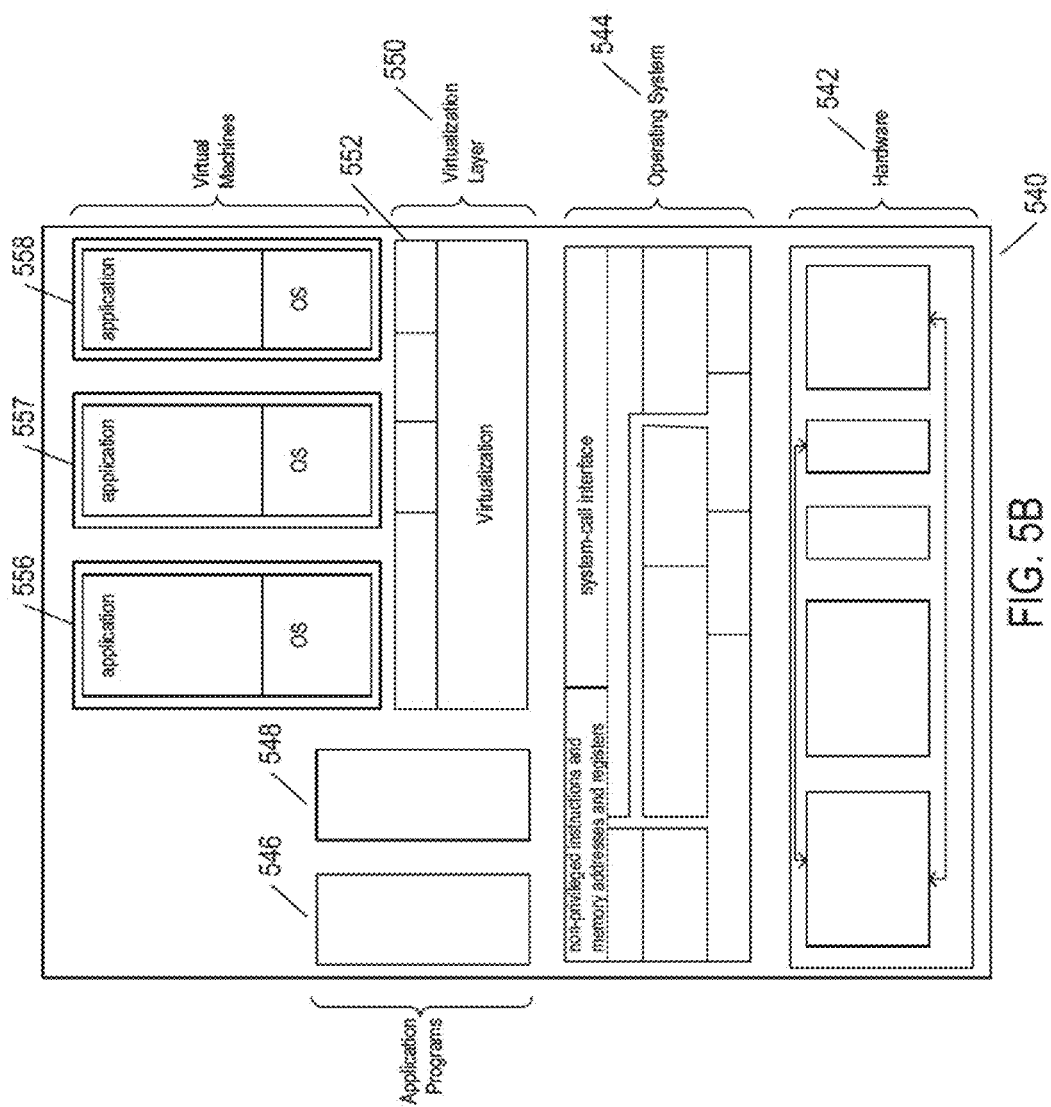

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
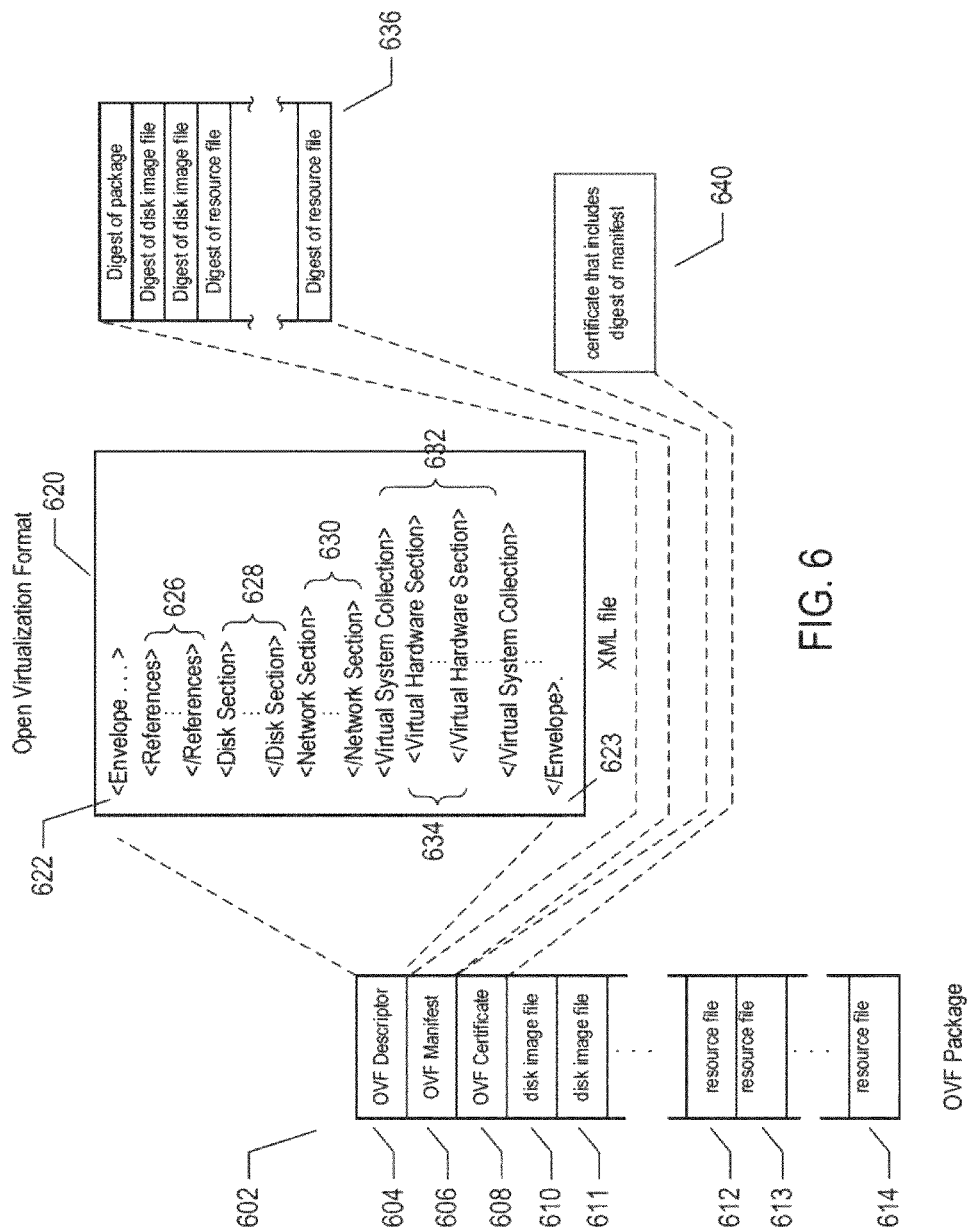
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
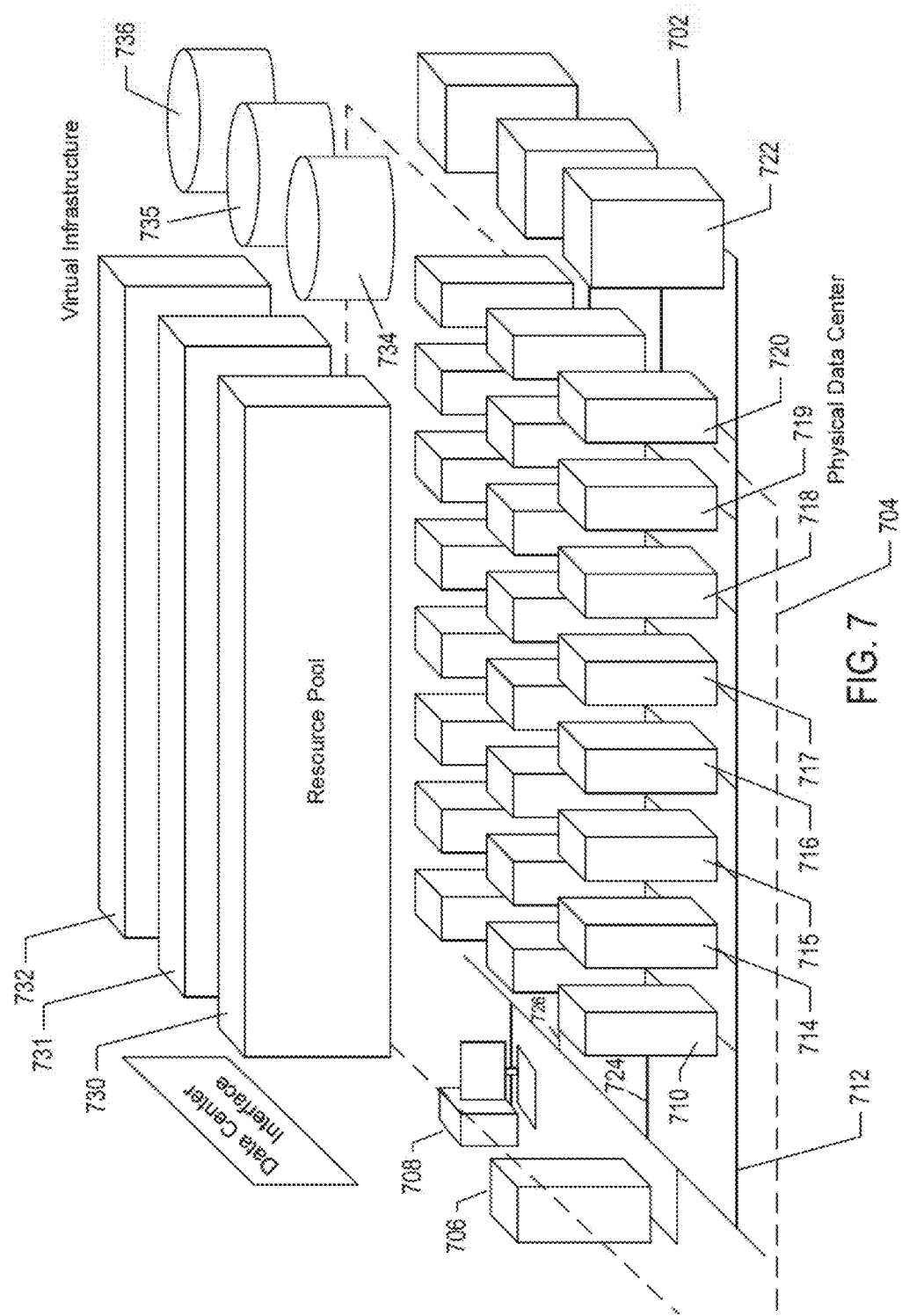
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
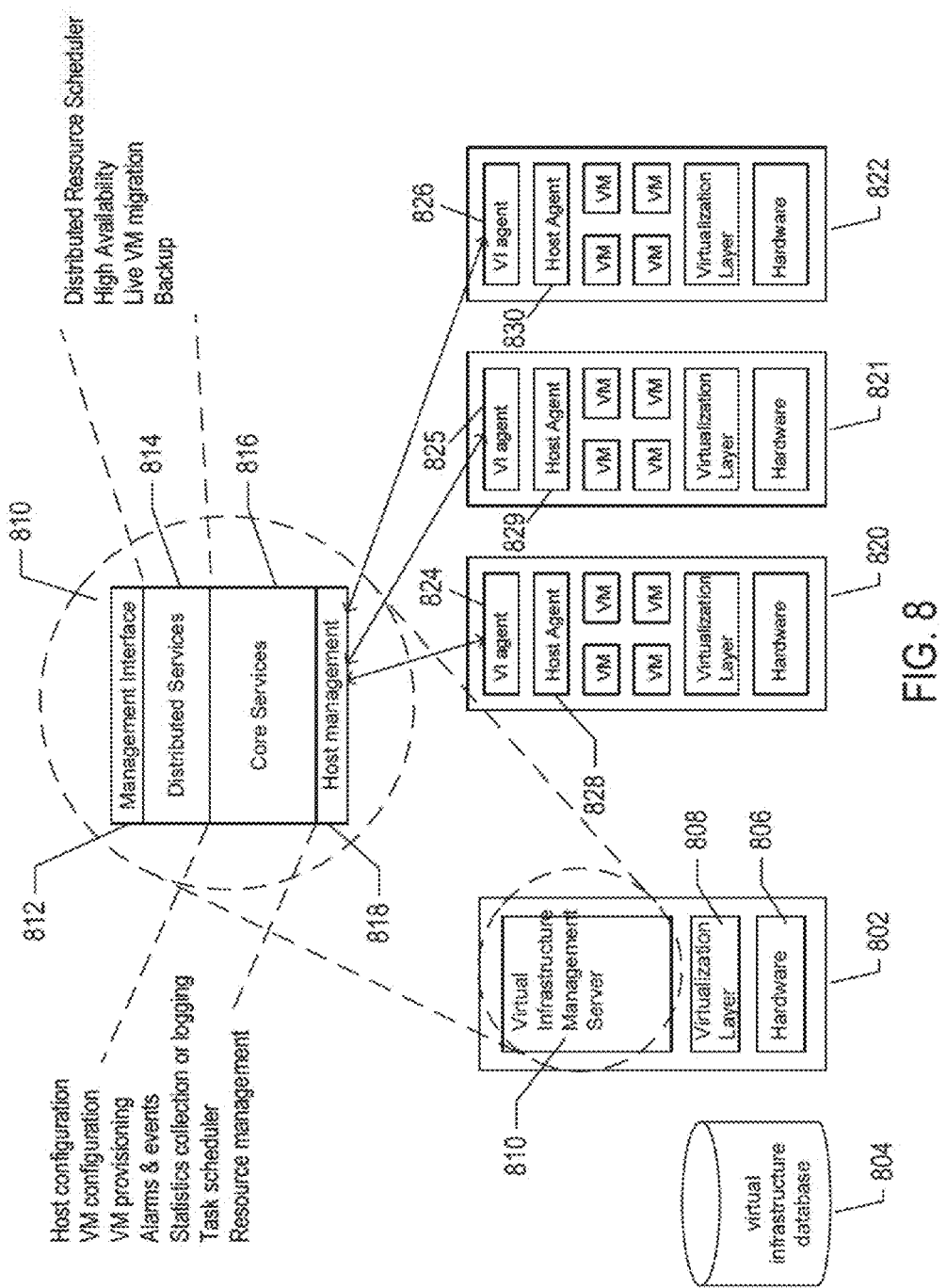
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
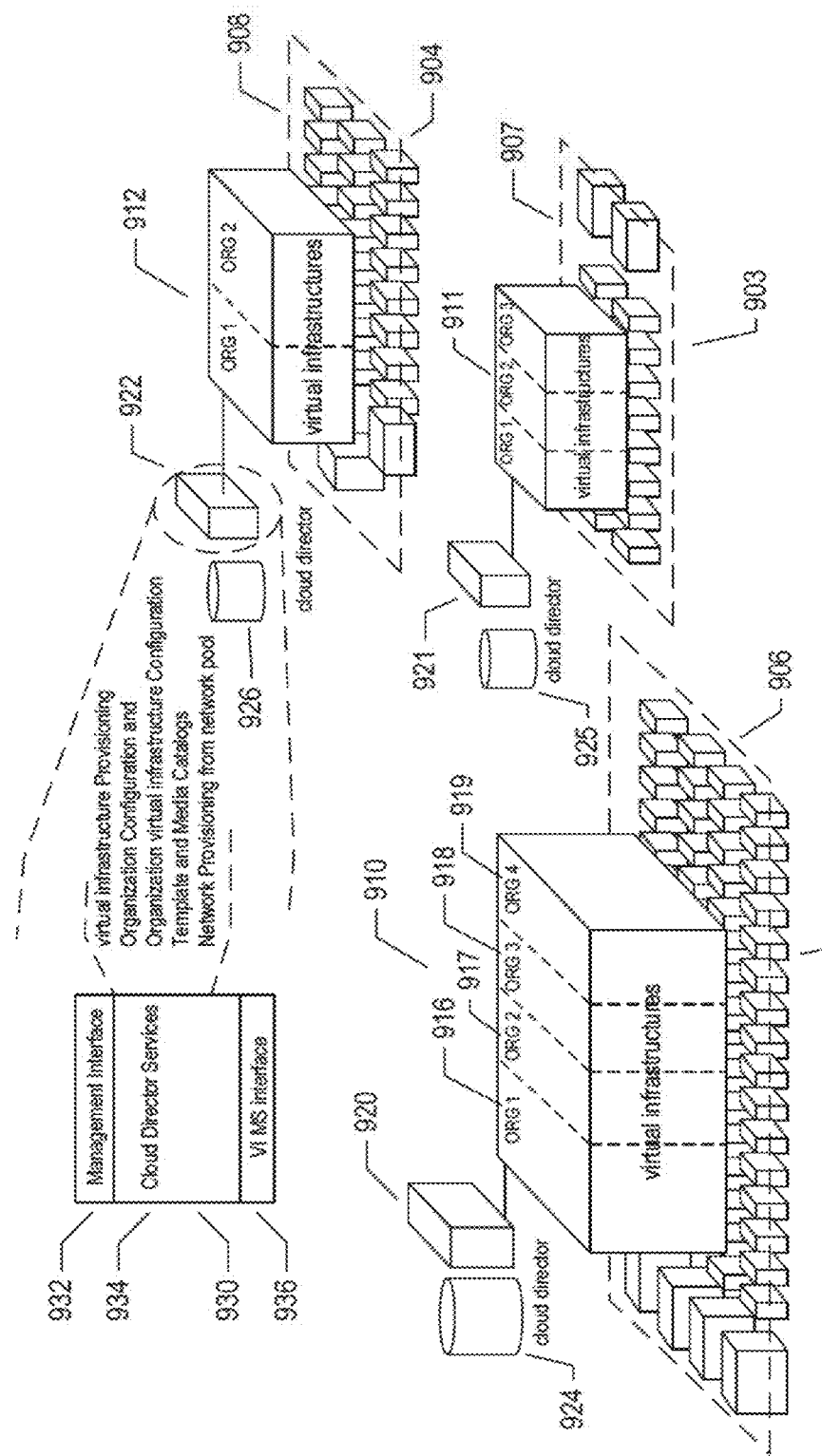
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
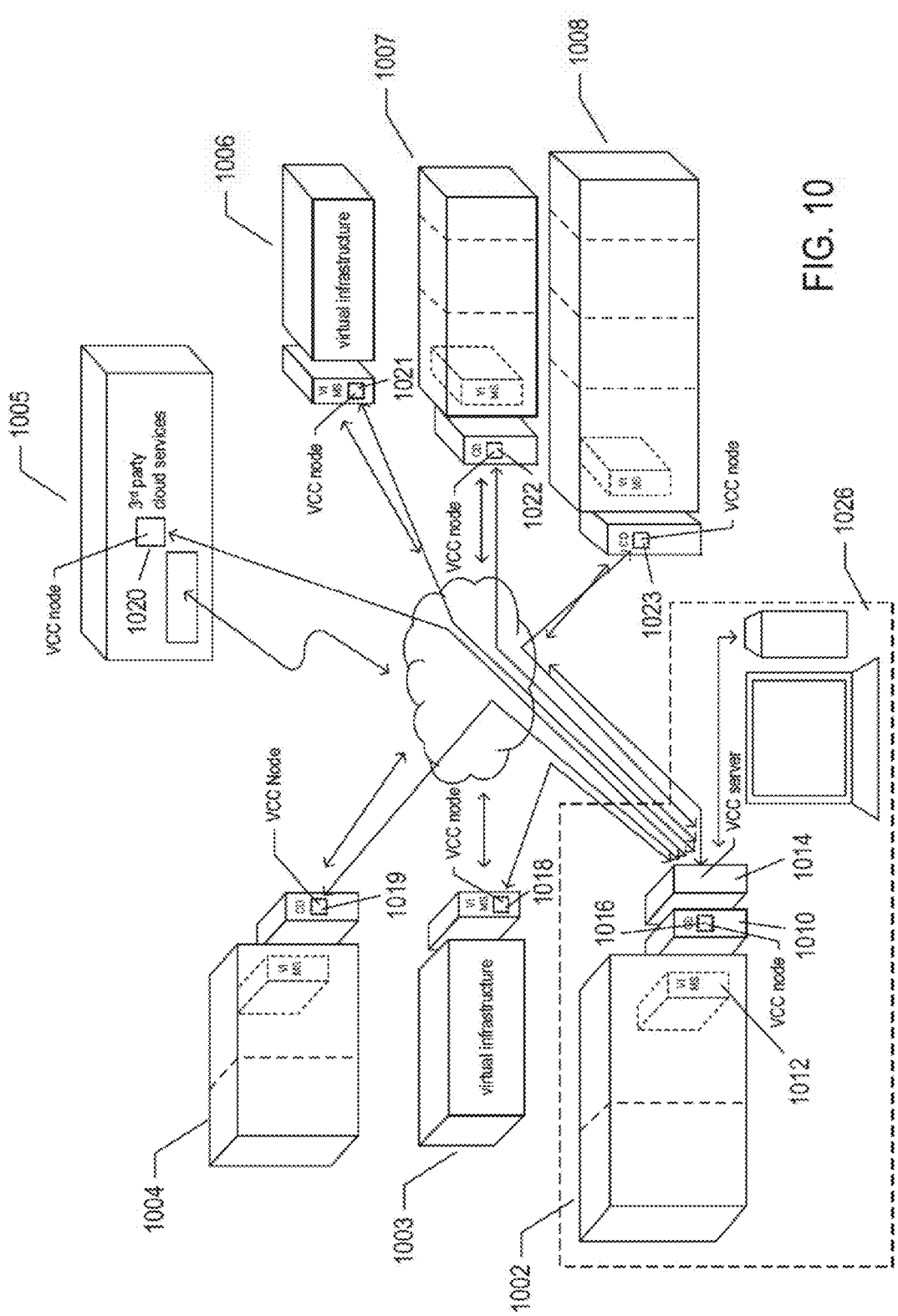
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
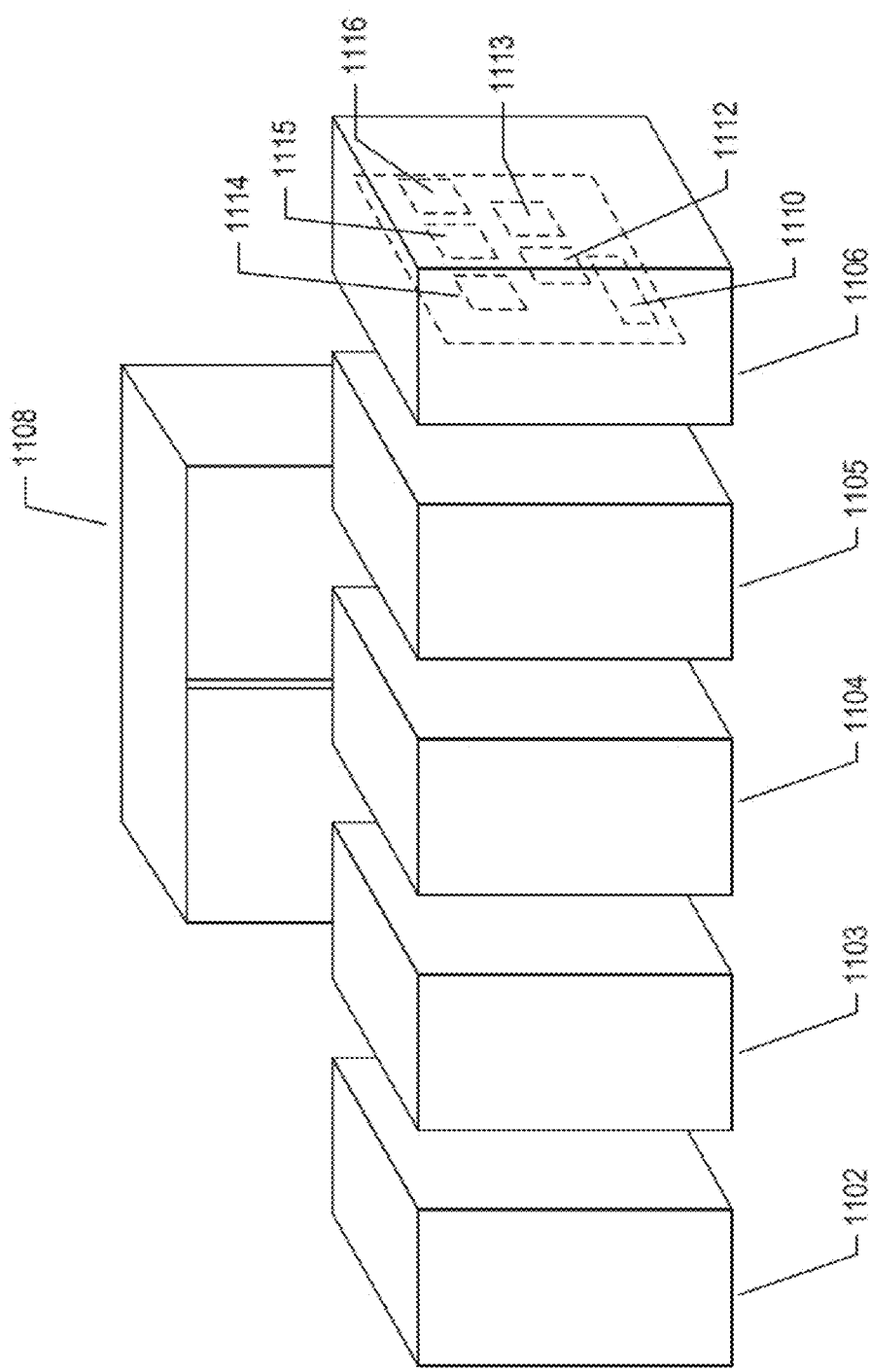
FIG. 11 illustrates an instruction-set architecture ("ISA") provided by a modern processor as the low-level execution environment for binary code and assembler code.

FIG. 11 illustrates an instruction-set architecture ("ISA") provided by a modern processor as the low-level execution environment for binary code and assembler code. The ISA commonly includes a set of general-purpose registers 1102, a set of floating-point registers 1104, a set of single-instruction-multiple-data ("SIMD") registers 1106, a status/flags register 1108, an instruction pointer 1110, special status 1112, control 1113, and instruction-pointer 1114 and operand 1115 registers for floating-point instruction execution, segment registers 1118 for segment-based addressing, a linear virtual-memory address space 1120, and the definitions and specifications of the various types of instructions that can be executed by the processor 1122. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 12:
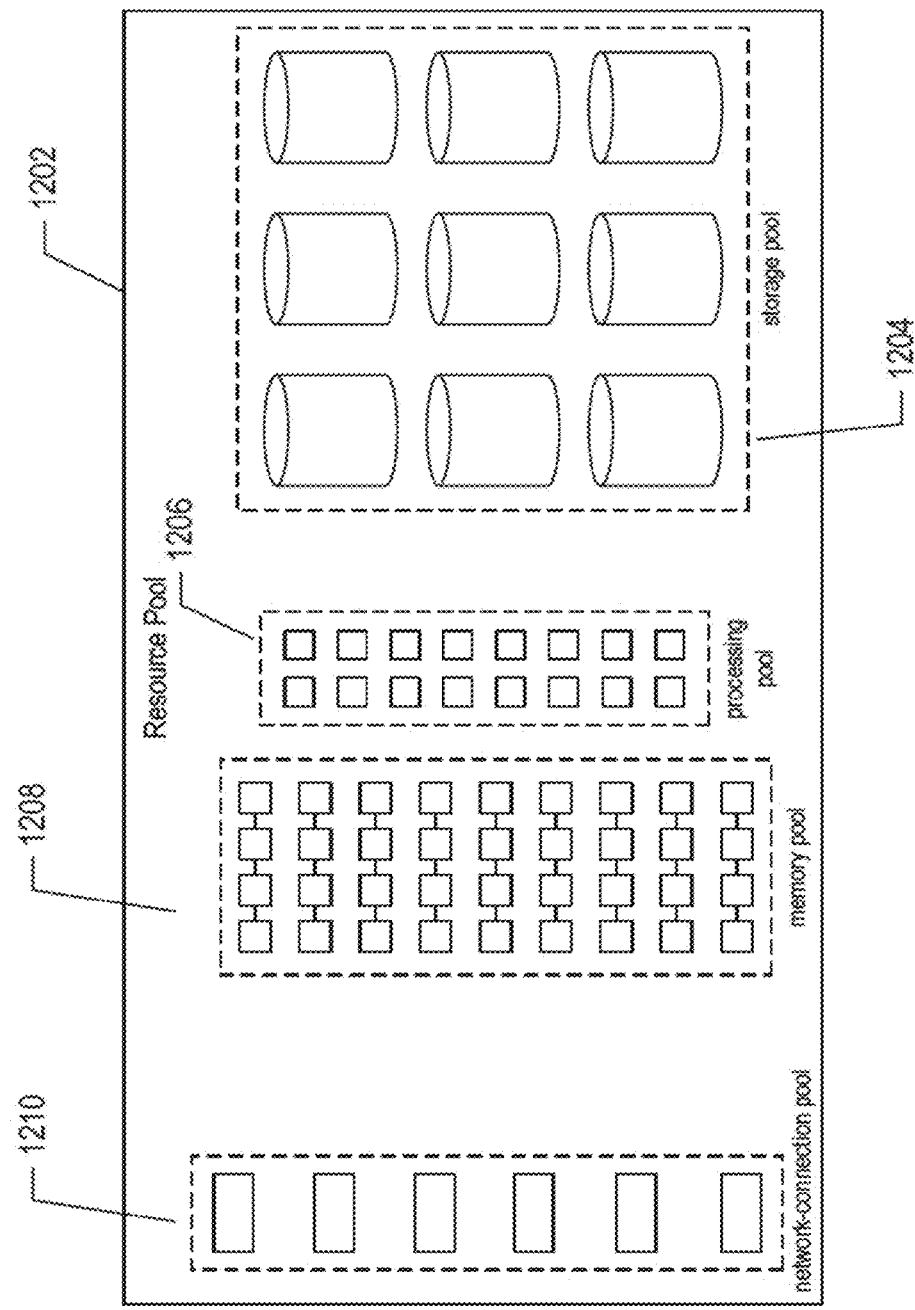
FIG. 12 illustrates an additional abstraction of processor features and resources used by virtual-machine monitors, operating systems, and other privileged control programs

FIG. 12 illustrates an additional abstraction of processor features and resources used by virtual-machine monitors, operating systems, and other privileged control programs. These processor features, or hardware resources, can generally be accessed only by control programs operating at higher levels than the privilege level at which application programs execute. These system resources include an additional status register 1202, a set of additional control registers 1204, a set of performance-monitoring registers 1206, an interrupt-descriptor table 1208 that stores descriptions of entry points for interrupt handlers, the descriptions including references to memory descriptors stored in a descriptor table 1210. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 1212 that contains entries pointing to page tables, such as page table 1214, each of which, in turn, contains a physical memory address of a virtual-memory page.

Containers and Containers Supported by Virtualization Layers

As mentioned above, while the traditional virtual-machine-based virtualization layers, described in the previous subsection, have enjoyed widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

Figure 13:
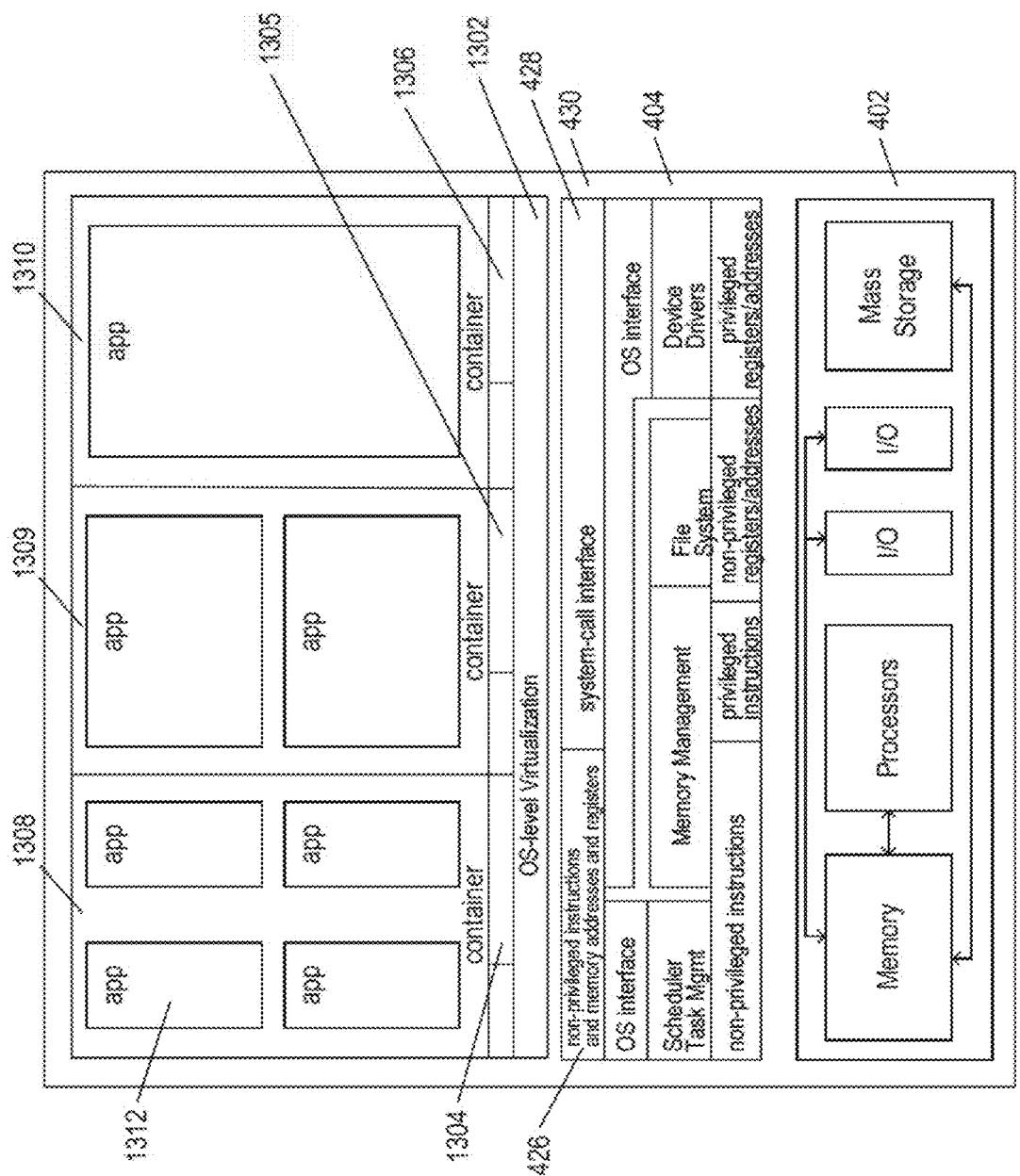
FIG. 13 illustrates OSL-virtualization.

Another approach to virtualization, as also mentioned above, is referred to as operating-system-level virtualization "OSL virtualization"). FIG. 13 illustrates OSL-virtualization. In FIG. 13, as in previously discussed FIG. 4, an operating system 404 runs above the hardware 402 of a host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system, OSL virtualization involves an OS-level virtualization layer 1302 that provides an operating-system interface 1304-1306 to each of one or more containers 1308-1310. The containers, in turn, provide an execution environment for one or more applications, such as application 1312 running within the execution environment provided by container 1308. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by the other containers. As a result, a container can be booted up much faster than a virtual machine, since the container uses operating-system-kernel features that are already available and functioning within the host computer. Furthermore, the containers share computational bandwidth, memory, network bandwidth, and other computational resources provided by the operating system, without the overhead associated with computational resources allocated to virtual machines and virtualization layers. Again, however, OSL virtualization does not provide many desirable features of traditional virtualization. As mentioned above, OSL virtualization does not provide a way to run different types of operating systems for different groups of containers within the same host system and OSL-virtualization does not provide for live migration of containers between host computers, high-availability functionality, distributed resource scheduling, and other computational functionality provided by traditional virtualization technologies.

Figure 14:
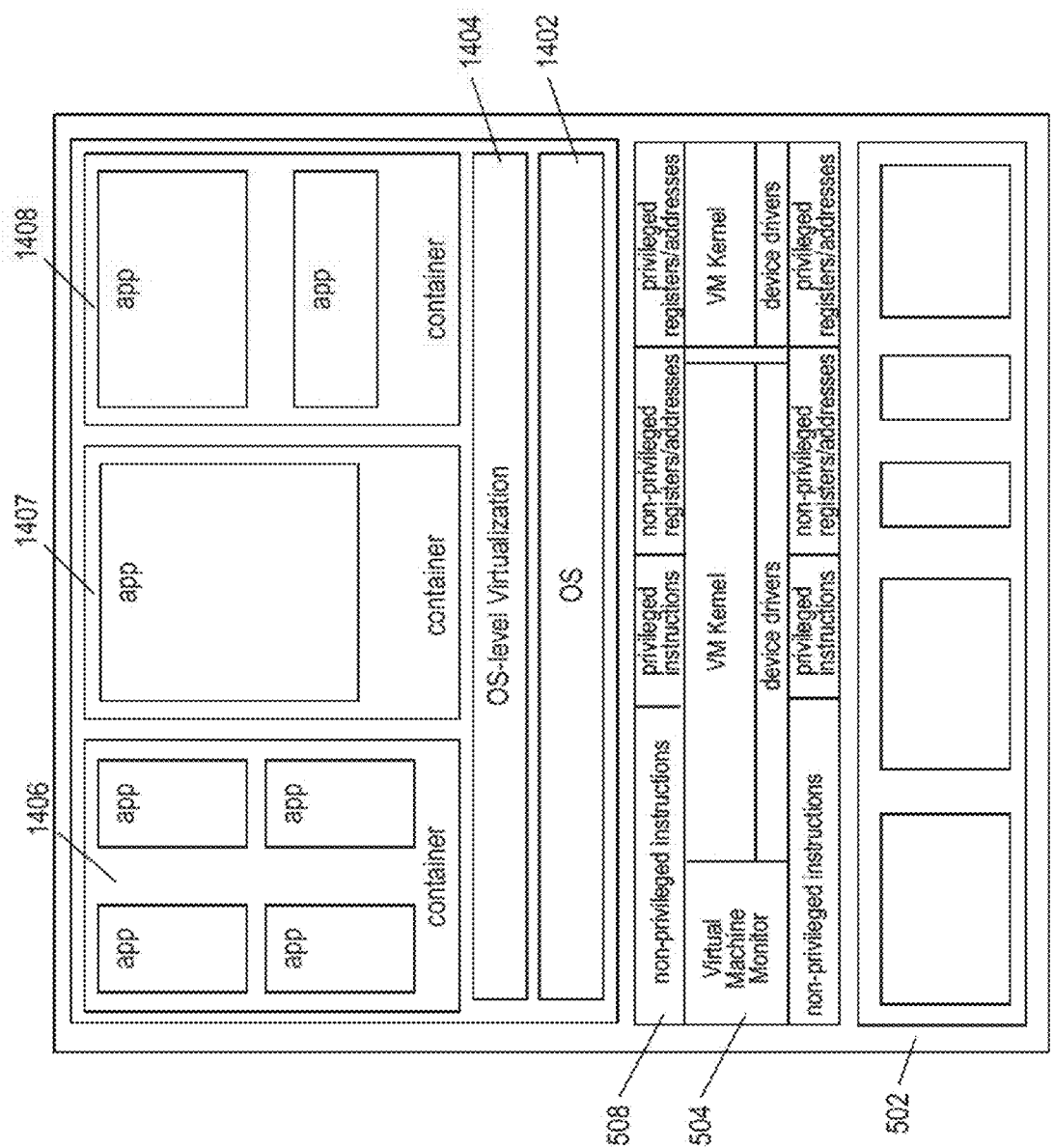
FIG. 14 illustrates an approach to combining the power and flexibility of traditional virtualization with the advantages of OSL virtualization.

FIG. 14 illustrates an approach to combining the power and flexibility of traditional virtualization with the advantages of OSL virtualization. FIG. 14 shows a host computer similar to that shown in FIG. 5A, discussed above. The host computer includes a hardware layer 502 and a virtualization layer 504 that provides a virtual hardware interface 508 to a guest operating system 1402. Unlike in FIG. 5A, the guest operating system interfaces to an OSL-virtualization layer 1404 that provides container execution environments 1406-1408 to multiple application programs. Note that, although only a single guest operating system and OSL virtualization layer are shown in FIG. 14, a single virtualized host system can run multiple different guest operating systems within multiple virtual machines, each of which supports one or more OSL-virtualization containers. A virtualized, distributed computing system that uses guest operating systems running within virtual machines to support OSL-virtualization layers to provide containers for running applications is referred to, in the following discussion, as a "hybrid virtualized distributed computing system."

Running containers above a guest operating system within a virtualized host computer provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1404, since there is almost no additional computational overheads associated with container-based partitioning of computational resources. However, many of the powerful and flexible features of the traditional virtualization technology can be applied to virtual machines in which containers run above guest operating systems, including live migration from one host computer to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and easy scaling over large numbers of host computers within large distributed computing systems and a simple approach to operating-system upgrades and patches. Thus, the use of OSL virtualization above traditional virtualization in a hybrid virtualized distributed computing system, as illustrated in FIG. 14, provides many of the advantages of both a traditional virtualization layer and the advantages of OSL virtualization.

Methods and Systems to which the Current Document is Directed

The current disclosure is particularly directed to an elastic scheduling method and system that anticipates the need for additional resources to support launching additional containers in a hybrid virtualized distributed computing system. Virtual-data-center administration facilities provided by the virtualization layer anticipates the future need for additional physical computational resources, such as additional host computers, memory, mass-storage devices, and other such resources. However, running OSL-virtualization containers above guest operating systems introduces new computational-resource issues not previously addressed within virtualization layers, including the need to anticipate when to provision and launch additional virtual machines in order to provide sufficient computational resources for launching of new containers to run additional client application programs and/or additional instances of already running application programs. When launching new VMs, the number of VMs to provision and launch and the amount of resources allocated to each of the VMs need to be carefully considered in order to minimize wastage of computational resources. Each VM is associated with a certain amount of overhead, so that, in general, it is best to launch fewer VMs with greater resource allocations, provided that the allocated resources match the anticipated need for additional computational resources to support launching of additional containers.

FIGS. 15A-D illustrate a problem domain addressed by the current document. In these figures, and in subsequent discussions, only the memory resource is considered, in order to facilitate clear and simple explanations of the elastic scheduling method and system. However, the same considerations applied to anticipating container-associated resource needs by launching new VMs and properly allocating memory to VMs can be similarly applied to other types of computational resources, including mass-storage resources, communications bandwidth resources, networking resources, and other resources associated with containers via guest operating systems and virtual machines. Furthermore, the example of FIGS. 15A-D assume, for ease of illustration, that the need for additional memory involves launching one or more new containers with a total associated memory resource equal to the needed additional memory, rather than expanding existing containers.

Figure 15A:
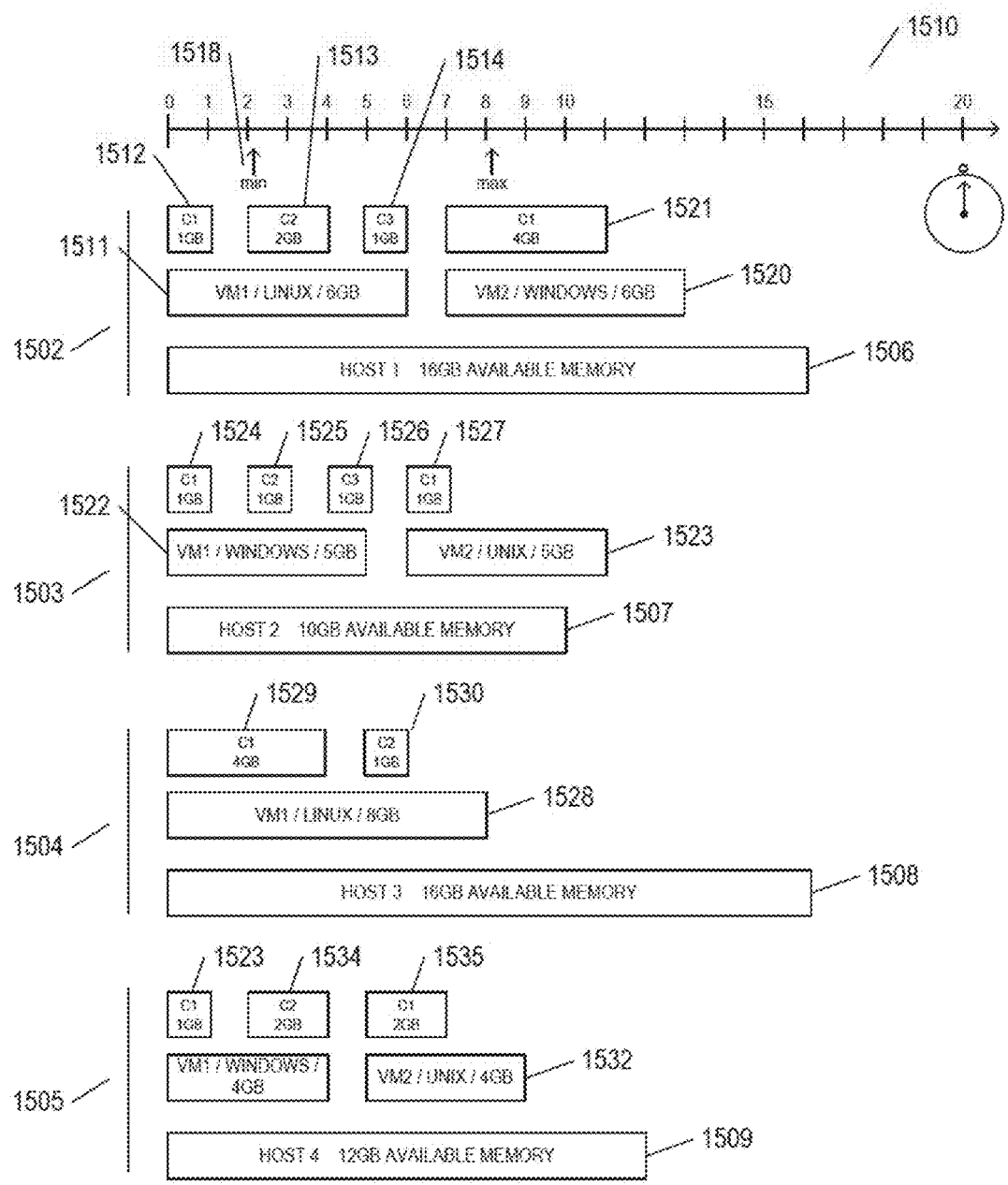
FIGS. 15A-D illustrate a problem domain addressed by the current document.

In FIG. 15A, the state of a hybrid virtualized distributed computing system is illustrated. The virtualized, distributed computing system includes four host computers represented by four sets of horizontal bars 1502-1505. The large horizontal bars 1506-1509 represent the amount of a physical memory resource within each of the host computers 1502-1505, respectively. A scale 1510 shows the correspondence between gigabytes of memory and the lengths of the horizontal bars representing the memory resource. Shorter horizontal bars representing the virtual machines currently running within the host computer are shown, in FIG. 15A, above the horizontal bars 1506-1509 representing the available physical memory within host computers. The shorter horizontal bars representing the virtual machines, such as horizontal bar 1511, indicate the local name for the virtual machine, the guest operating system running within the virtual machine, and the available memory for supporting OSL-virtualization containers. A third level of short horizontal bars, above the shorter horizontal bars representing virtual machines, represent containers running within the guest-operating-system-provided execution environment. For example, short horizontal bars 1512-1514 represent three containers C1, C2, and C3, respectively, running within a Linux execution environment within virtual machine VM1 1511 executing on host computer 1502. The local name of the container and the amount of memory utilized by the container are shown within each short horizontal bar representing a container. A clock symbol 1516 is used to indicate a time point at which the state snapshot represented by the sets of horizontal bars was obtained. The min and max arrows 1518-1519 represent the minimum amount of memory and the maximum amount of memory that can be allocated to a virtual machine when the virtual machine is provisioned and launched. Thus, according to FIG. 15A, the example hybrid virtualized, distributed computing system includes: (1) a first host computer 1506 on which two virtual machines 1511 and 1520 are currently executing, the first virtual machine 1511 supporting three containers 1512-1514 and the second virtual machine 1520 supporting a single container 1521; (2) a second host computer 1507 on which two virtual machines 1522 and 1523 are currently executing, the first of which 1522 is currently supporting three containers 1524-1526 and the second of which 1523 currently supports a single container 1527; (3) a third host computer 1508 on which a single virtual machine 1528 is currently running and supporting two containers 1529 and 1530; and a fourth host computer 1509 on which two virtual machines 1531 and 1532 are currently running, the first of which 1531 currently supports two containers 1533 and 1534 and the second of which 1532 is currently supporting a single container 1535.

Figure 15B:
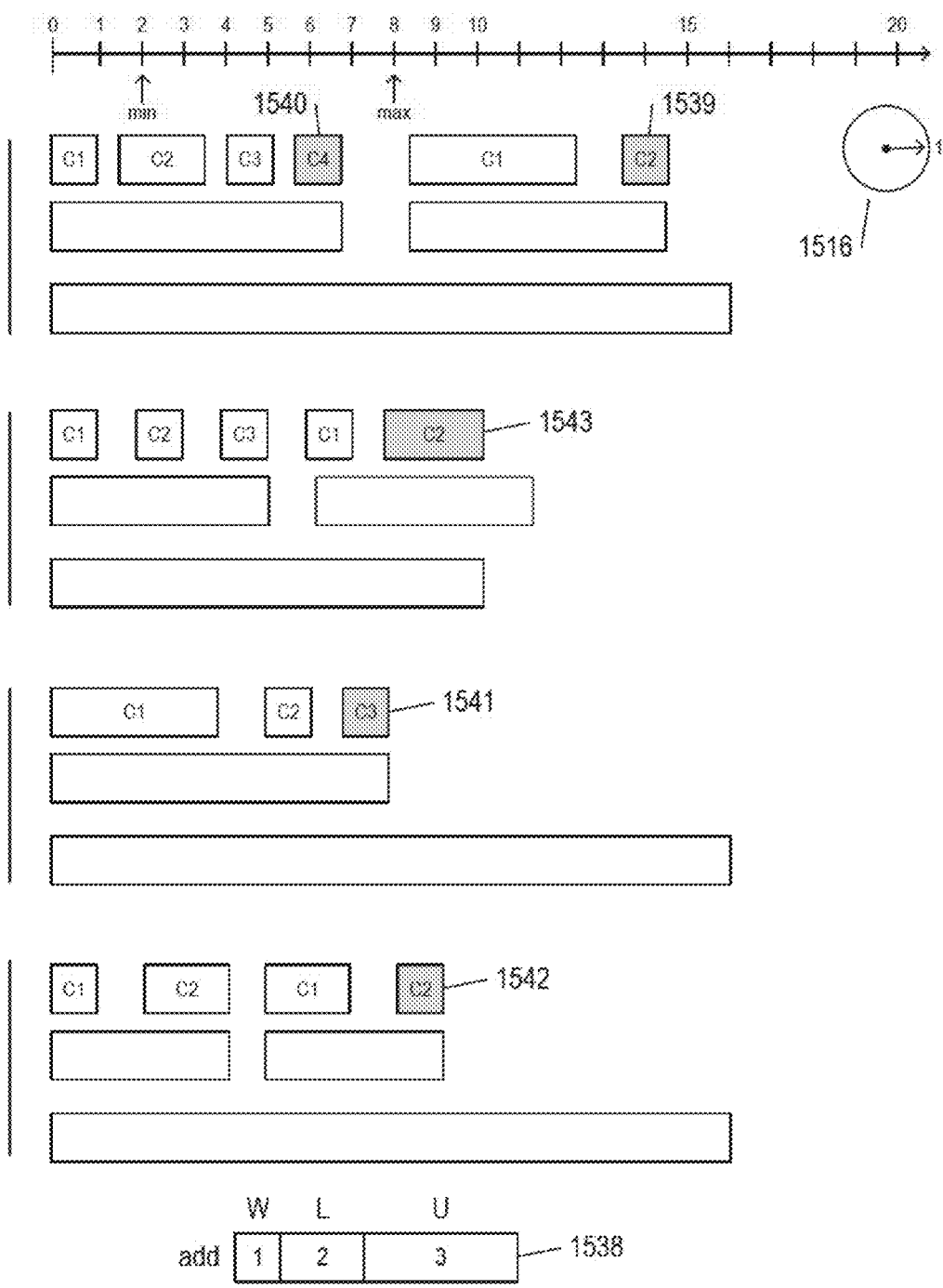

FIG. 15B illustrates the state of the hybrid virtualized distributed computing system at a second, later time point, as indicated by advancement of the clock symbol 1516. At this time point, new containers need to be launched to handle a demand for new application instances. The total memory allocation needed to be associated with new containers of each type of operating system is indicated by the horizontal bar 1538 at the bottom of FIG. 15B. This horizontal bar indicates that an additional 1 gigabyte ("GB") of memory is needed in new containers for the Windows operating system, an additional 2 GB of memory is needed in new containers for the Linux operating system, and an additional 3 GB of memory is needed within new containers running above the Unix operating system. In the simple example of FIGS. 15A-D, only the total amount of memory associated with the new containers is considered. Space needs to be found, within currently executing virtual machines, for launching new containers in order to meet the additional memory requirements indicated by horizontal bar 1538. This can be accomplished by adding a 1 GB container 1539 running within a Windows guest operating system, adding two 1 GB containers 1540-1541 running within two instances of the Linux guest operating system, launching a 1 GB container 1542 running within a first instance of the Unix guest operating system, and launching a 2 GB container 1543 running within a second instance of the Unix guest operating system.

Figure 15C:
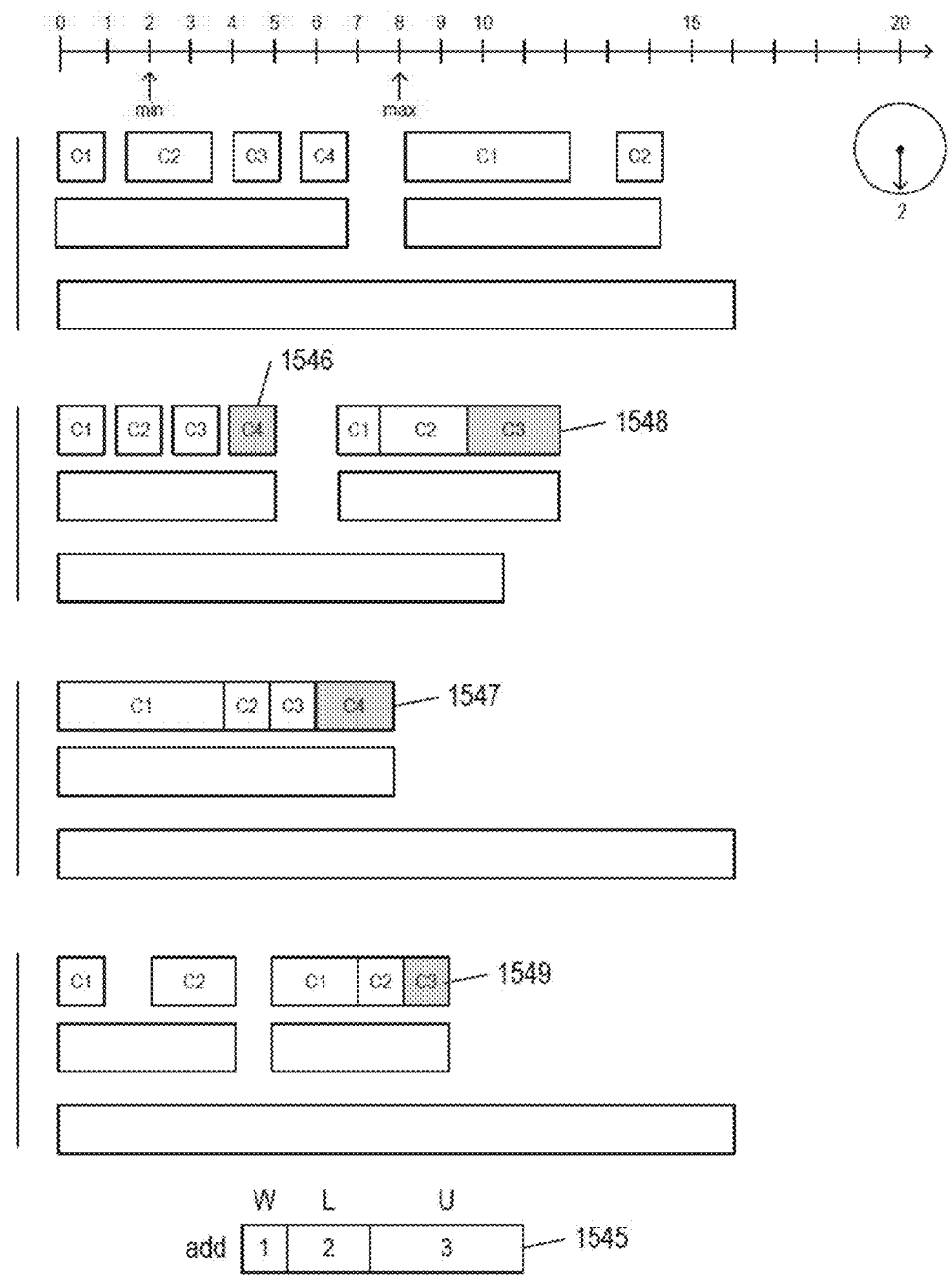

FIG. 15C shows the state of the hybrid virtualized distributed computing system at a third time point and again uses a horizontal bar 1545 to indicate the memory resources that need to be added by launching containers for each of the three different types of operating systems. This is accomplished by adding a single 1 GB container 1546 within a Windows guest operating system, adding a 2 GB container 1547 running within a Linux guest operating system, a 2 GB container running within a first instance of the Unix operating system 1548, and adding a 1 GB container 1549 running within a second Unix guest operating system.

Figure 15D:
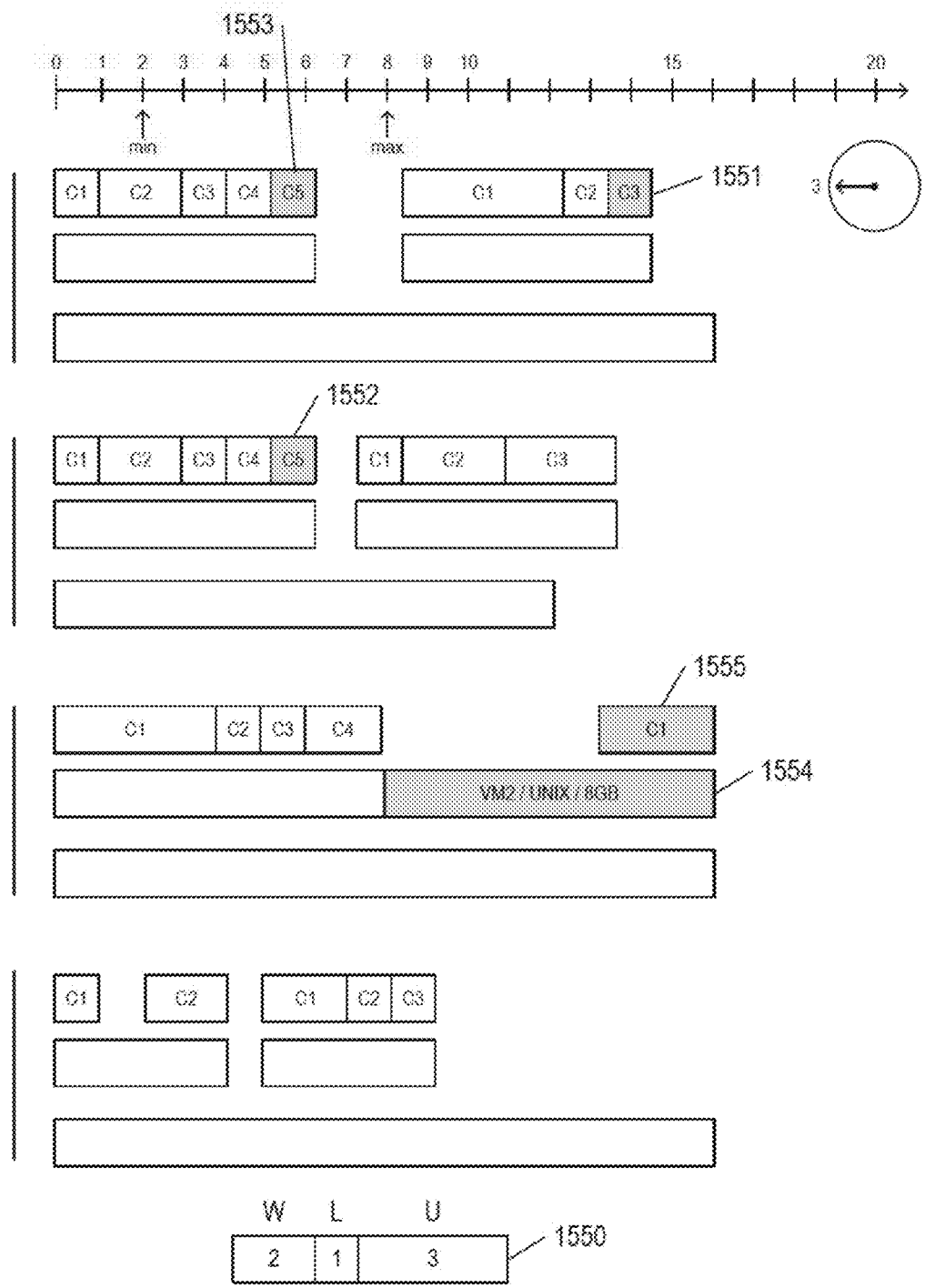

FIG. 15D shows the state of the hybrid virtualized distributed computing system at a fourth time point. Horizontal bar 1550 indicates that two more gigabytes need to be associated with one or more new containers running within the Windows guest operating system, one additional gigabyte needs to be associated with containers running within the Linux operating system, and three additional gigabytes of memory need to be associated with new containers running within the Unix operating system. The demand for Windows memory is met by adding a first 1 GB container

1551 to a first Windows virtual machine and a second 1 GB container 1552 to a second Windows virtual machine. The Linux demand is satisfied by adding a 1 GB container 1553 to a Linux virtual machine. However, there is no additional available memory within Unix virtual machines to support the addition of new containers. As a result, a new Unix virtual machine is provisioned and launched 1554 and a new 3GB container 1555 is launched to run within the execution environment provided by the newly launched Unix VM 1554. However, there is a problem associated with this reactive, on-demand-based launching of virtual machines. There may be significant boot time associated with provisioning and launching a new VM, in which case launching of new client application instances is delayed while the new VM or VMs are provisioned and launched, although certain technologies, including VMfork provided by the VMware Corporation, can ameliorate these overheads. Furthermore, there is no clear way to decide the amount of resources to allocate for the newly launched VM. For example, VM 1554 could have been allocated only 3 GB in order to support the current demand for Unix containers in order to conserve memory resources within the third host computer for launching additional VMs running different operating systems.

A better approach to launching and provisioning VMs to support containers in a hybrid virtualized distributed computing system would be to attempt to anticipate the need for new virtual machines well before they are actually needed, so that sufficient computational resources are available to launch new containers on demand. Moreover, by anticipating the demand for resources to launch of new containers, new VMs can be launched with appropriate amounts of allocated resources to efficiently satisfy expected demands for computational resources.

FIGS. 16A-C provide an indication of how the expected demand for memory associated with containers running within particular operating systems may be estimated, using the example of FIGS. 15A-C. FIG. 16A shows a simple interpolated demand curve based on the demand for Windows-container-associated memory in the final three time periods represented by FIGS. 15B-D. The values of the data points are found in the bottom horizontal bar in FIGS. 15B-D that indicate the additional memory demands at the respective time points, such as horizontal bar 1538 in FIG. 15B. FIGS. 16B and 16C show similar demand curves for Linux-container-associated memory and Unix-container-associated memory, respectively. Based on the upward-trending demand curve 1602 for Windows-container-associated memory, one might intuitively estimate that, in a next time period, the demand for new Windows-container-associated memory might fall somewhere within the ellipse 1603. Similarly, the downward-trending demand curve 1604 for Linux-container-associated memory might lead one to guess that the demand for Linux-container-associated memory might fall somewhere in the ellipse 1605 in a subsequent, fourth time period. Because the demand curve 1606 for Unix-container-associated memory is constant, one might assume that the demand for new Unix-container-associated memory in a fourth monitoring period might fall within the small ellipse 1607. Thus, by tracking a time series of demand for additional container-associated memory for each of the various operating systems supported within a hybrid virtualized distributed computing system, it might be possible to anticipate or estimate future demand and to automatically provision VMs well before the resources associated with the VMs are actually needed for launching new containers. For example, during the second time period, shown in FIG. 15C, it would have been possible to estimate, based on the first two data points in demand curve 1606, that three additional gigabytes of memory associated with Unix containers would be needed by time period 3, shown by FIG. 15D, and a new Unix VM could have been provisioned and launched, at monitoring period 2, to anticipate the demand for Unix-associated memory that arose by time period 3.

There are a variety of different, well-known methods for estimating or extrapolating a subsequent data point from a time series of data points. FIGS. 17A-C illustrate three of the many different data-point-extrapolation methods. In each of FIGS. 17A-C, a plot of the values of a discrete function with respect to time is shown. The data points, such as data point 1702 in FIG. 17A, represent the function value at a particular point in time, such as time point 1704 on the horizontal axis 1706 corresponding to data point 1702 with value equal to the height of the data point above the horizontal, time axis 1706. One method for estimating a subsequent data point, shown in FIG. 17A, is to use linear regression to determine a best-estimated line 1708 that fits the data points in the time series of data points. In one approach, a line is computes that minimizes the squared vertical deviations of the data points from the line. Once a best-fitting line 1708 is obtained, a next data point in the time series 1710 is estimated as the intersection between the best-fitting line and a vertical line passing through the time at which the estimated function value is desired. Another approach, shown in FIG. 17B, is to attempt to fit some type of constrained curve to the data points. The curve may have local radius of curvature constraints, for example, so that it is reasonably smooth. Once the curve 1712 is determined, then the value of the next data point in the time series can be estimated 1714 as the intersection of the curve and the vertical line corresponding to the next time point 1716. Yet another approach, as shown in FIG. 17C, is to attempt to optimally fit some number of lines or curves to the data points and estimate the subsequent data point 1718 from the intersection of the vertical line 1720 to the next time interval and the final linear or curved segment 1722 estimated from the time series of data points. There are many additional methods that can be used to extrapolate the values of subsequent data points in a data-point time series.

FIGS. 18A-D provide control-flow diagrams that illustrate a monitoring method that monitors utilization of a computational resource by containers within virtual machines of a hybrid virtualized distributed computing system in order to anticipate the need to provision and launch new VMs in order to have resources available to meet expected demands for new container-associated resources. In this simplified example, the configured and utilized computational resource within a virtualized, distributed computing system is determined, at each monitoring interval. Based on a most recent time series of configuration and utilization data points, demand for new container-associated resources is estimated so that, when the estimated demand indicates the need for proactive provisioning and launching of VMs, the VMs can be provisioned and launched prior to the actual need for their associated resources in order to launch containers. In this first described implementation, the monitoring method maintains a time series of data points in which the time interval between data points is equal to the monitoring period. This constraint simplifies the implementation, but is removed in a second implementation, discussed later in the current document.

Figure 18A:
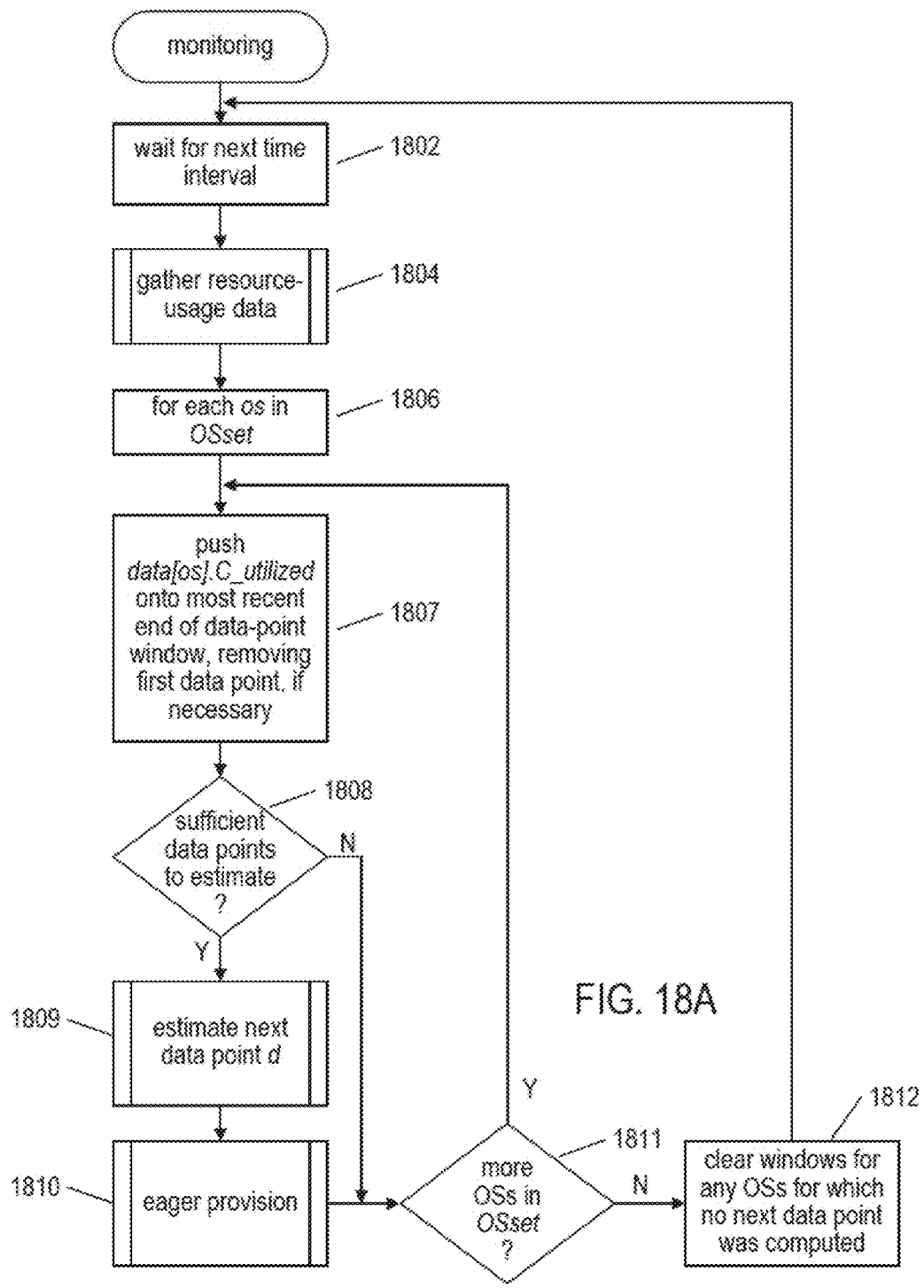
FIGS. 18A-D provide control-flow diagrams that illustrate a monitoring method that monitors utilization of a computational resource by containers within virtual machines of a hybrid virtualized distributed computing system in order to anticipate the need to provision and launch new VMs in order to have resources available to meet expected demands for new container-associated resources.

FIG. 18A shows a high-level monitoring routine. In step 1802, the monitoring routine waits for a next time interval, or monitoring interval. When the next interval arrives, the monitoring routine gathers resource-usage data, in step

1804, from the hybrid virtualized distributed computing system. Then, in the for-loop of steps 1806-1811, the monitoring routine considers each type of operating system ("OS") in a set of operating-system types OSset that represents the operating systems used within the hybrid virtualized distributed computing system. The monitoring routine uses a data-point window for each operating system type to store a most recent time series of data points that represent aggregate utilization of the computational resource by the containers currently running within instances of the operating system type in virtual machines executing within the hybrid virtualized distributed computing system. In addition, the monitoring routines collects various data on a per-operating-system basis and stores the data in an array data of records or structures.

In step 1807, the monitoring routine pushes the amount of the computational resource, data[os].C_utilized, utilized by the containers running within guest operating systems of the currently considered type of operating system that were launched during the most recent monitoring interval onto the end of the data-point window. The push operation may remove the first data point of the window, when necessary, in order to make space to push the most recently determined data point onto the data-point window. When there are as sufficient number of data points in the data-point window to estimate the projected utilization of the computational resource for the next, future time interval, as determined in step 1808, the monitoring routine estimates the next data point d, in step 1809, using a data-point extrapolation method, such as one of those discussed above with reference to FIGS. 17A-C. The monitoring routine then uses the estimated data point to carry out eager provision of new VMs, when a future need for more resources is indicated by the estimated data point value d, in step 1810. The routine "eager provision" is discussed below with reference to FIG. 18D. When there are more OS types in the set of OS types OSset, as determined in step 1811, control returns to step 1807 to estimate the demand for the computation resource for a next operating-system type. When all the operating-system types have been considered, the data point windows for any operating-system types for which no data point was computed in the current monitoring interval are cleared, in step 1812, since there would otherwise a discontinuity in the time series of data points. A data point is not computed for an operating-system type, for example, when there are no currently executing VMs that run an operating system of that type.

Figure 18B:
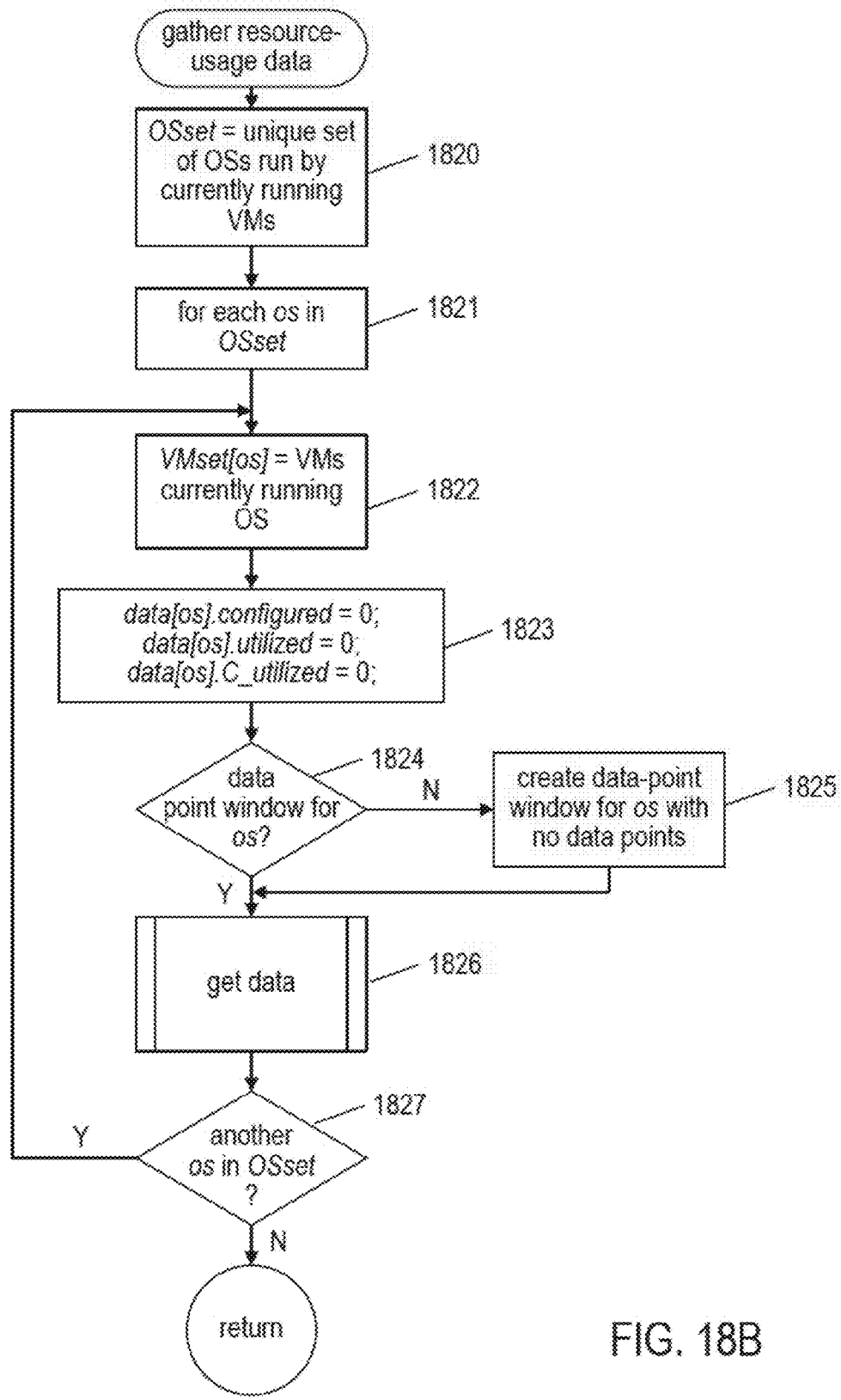

FIG. 18B provides a control-flow diagram for the resource-usage-data gathering step 1804 in FIG. 18A. In step 1820, the set of OS types OSset is initialized to contain the set of unique OS types of guest operating systems currently running within VMs of the hybrid virtualized distributed computing system. In the for-loop of steps 1821-1827, each OS type in the set of types OSset is considered. In step 1822, the set VMset[os] for the currently considered OS type os is initialized to include all of the VMs within the hybrid virtualized distributed computing system currently running the currently considered OS type os. In step 1823, three different data values for the OS type os, data[os].configured, data[os].utilized, and data[os].C_utilized are set to 0. The data value data[os].configured accumulates the configured amount of the resource for the VMs currently running an operating system of the currently considered OS type os. The data value data[os].utilized accumulates the total amount of the resource currently utilized by the VMs currently running the currently considered OS type. The data value data[os].C_utilized accumulates the total amount of the resource currently utilized by containers running within the execution environments provided by the VMs currently running the currently considered OS type os. When there is no data-point window for the currently considered OS type os, as determined in step 1824, then an empty data-point window is created for the OS type as in step 1825. In step 1826, a routine "getData" is called to obtain the data for the OS type os. When there are more OS types in the OSset, as determined in step 1827, control returns to step 1822. Otherwise, the resource-usage-data gathering routine returns.

Figure 18C:
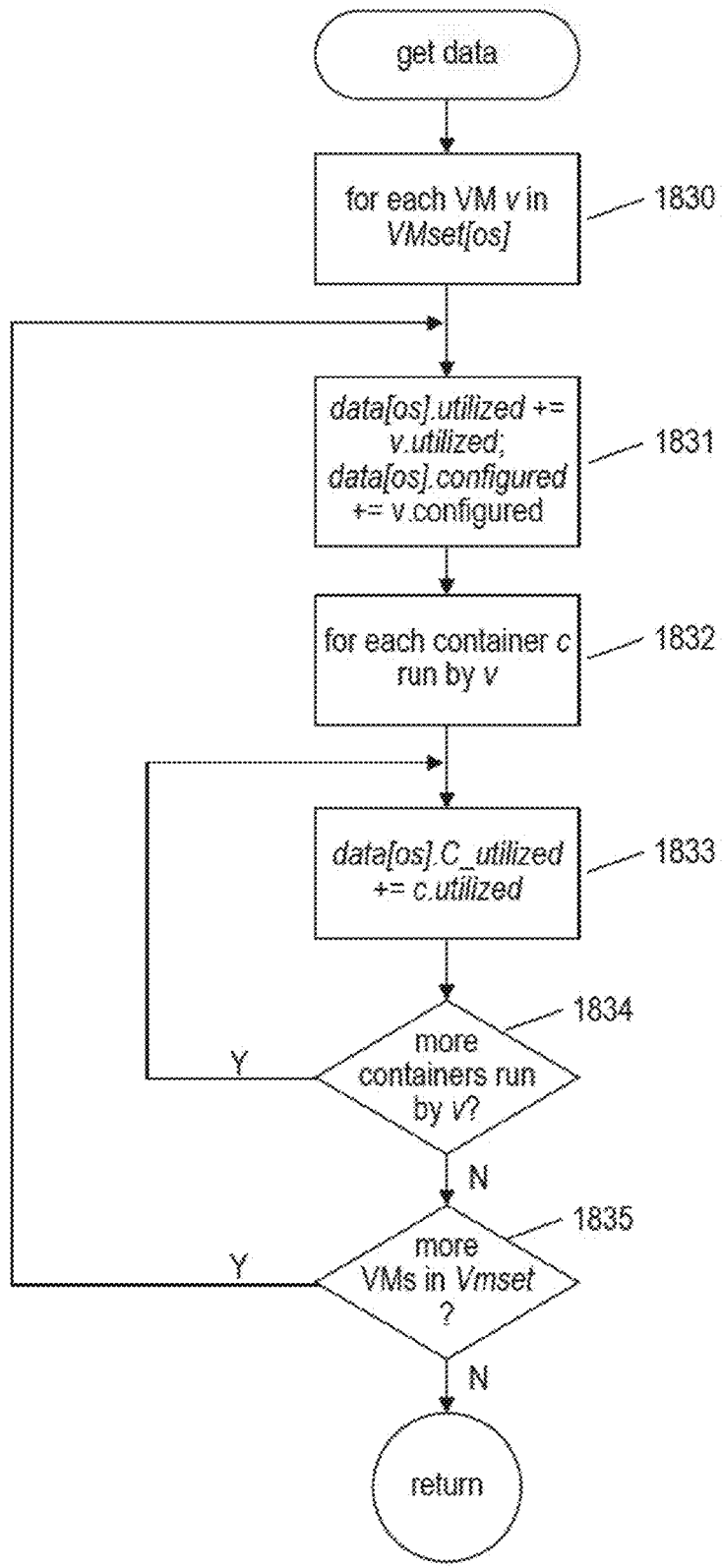

FIG. 18C is a flow-control diagram for the routine "getData," called in step 1826 in FIG. 18B. In the for-loop comprising steps 1830-1834, each virtual machine v in the set of VMs, VMset[os], currently running an operating system of type os is considered. The amount of the computational resource utilized by the currently considered VM v is added to the data value data[os].utilized and the amount of the resource configured for the currently considered VM v is added to the data value data[os].configured, in step 1831. Next, in the inner for-loop of steps 1832-1835, each container currently running within currently considered VM v and that was launched in the most recent monitoring interval is considered. In step 1833, the amount of the computational resource utilized by the currently considered container c is added to the data value data[os].C_utilized. When there are more containers running within the VM v to consider, as determined in step 1834, control flows back to step 1833. Otherwise, when there are more VMs in the set of VMs VMset[os], as determined in step 1835, control flows back to step 1831. Otherwise, the routine "getData" returns.

Figure 18D:
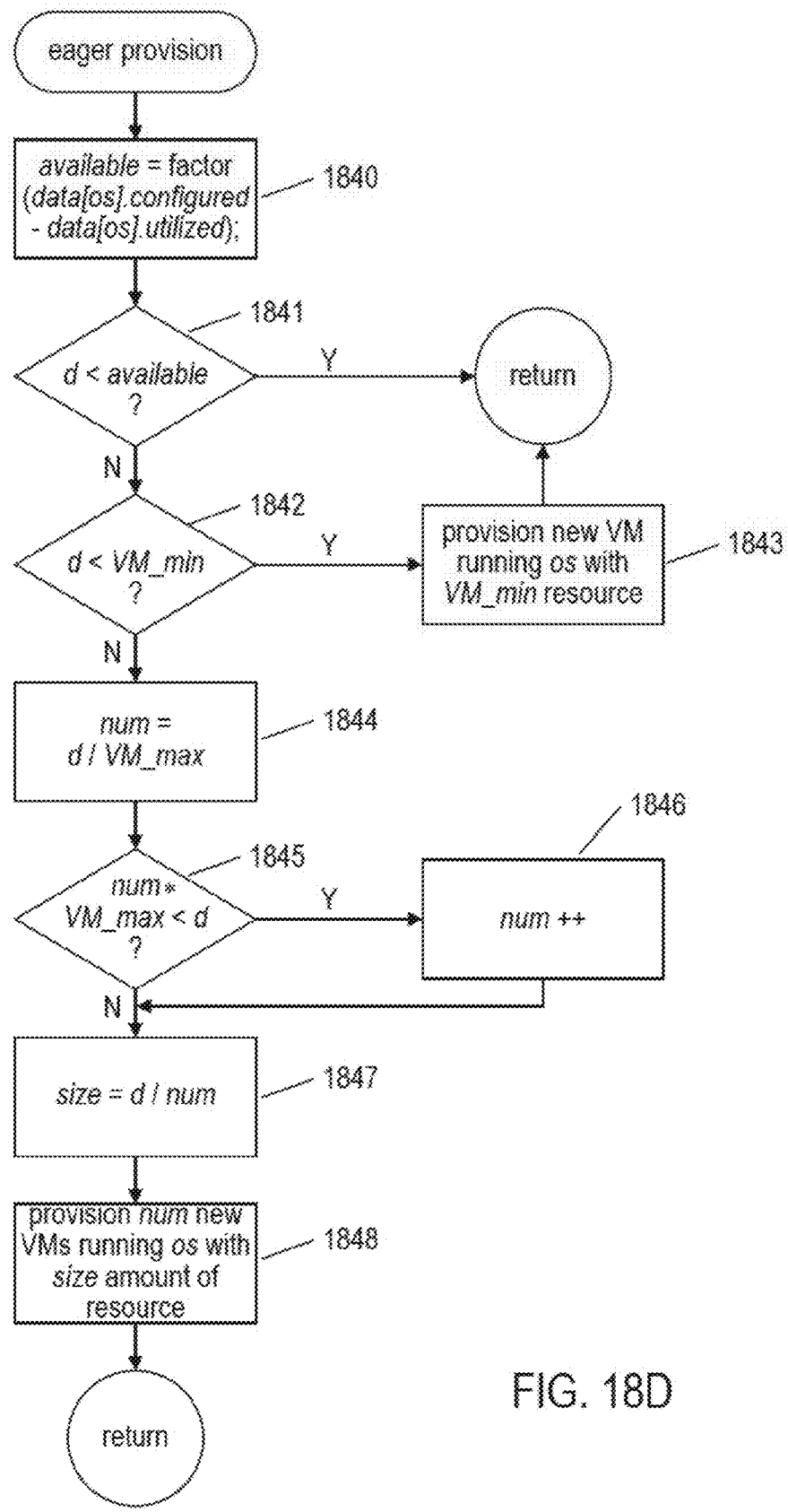

FIG. 18D provides a control-flow diagram for the routine "eager provision" called in step 1810 of FIG. 18A. In step 1840, the routine "eager provision" computes the available amount of the computational resource for the VMs running a guest operating system of type os as a factor, generally between 0.8 and 0.9, times the difference between the amount of the computational resource configured for the VMs and the amount of the computational resource utilized by the VMs. When the computed available amount of the computational resource is greater than the projected demand d, where d is estimated in step 1809 of FIG. 18A, as determined in step 1841, then the routine "eager provision" returns. Otherwise, at least one new VM running an operating system of type os is needed in the near future. When d is less than the minimum amount of the resource that can be allocated to a new VM during provisioning of the VM, as determined in step 1842, then a new VM with the minimum amount of the computational resource is provisioned and launched, in step 1843. Otherwise, the variable num is set to the estimated demand d divided by the maximum amount of the computational resource that can be allocated to a new VM during provisioning. When the product of num and the maximum amount of memory that can be allocated to a new VM is less than the estimated demand value d, as determined in step 1845, num is incremented in step 1846. The variable size is set to d divided by num, in step 1847 and, in step 1848, a number num of new VMs is provisioned with an amount of the computational resource indicated by the value of the variable size. By this method, the estimated demand is met either by a single new VM to which a minimum amount of the resource is allocated or by one or more new VMs to which close to the maximum amount of the computational resource is allocated.

FIGS. 19A-E show a simple C++-like implementation of a monitor routine that monitors the hosts within a hybrid virtualized distributed computing system in order to anticipate the need for additional VMs in order to accommodate a projected demand for resources to launch new containers within the execution environments provided by VMs. This C++-like implementation is an alternative illustration of the method previously described using flow diagrams in which the constraint that the monitoring interval be equal to the data-point time interval is relaxed.

FIG. 19A includes a first portion of a header file that contains various constants, an enumeration, declarations of several routines and data structures, and declarations of a small number of classes. An initial set of constant declarations 1902 includes declarations of the constants: (1) n, the number of time intervals over which the demand for new resources associated with newly launched containers is considered, with the number of considered intervals generally corresponding to the number of data points from which future demand is projected; (2) monitoring_period, the length of the interval between execution of the monitoring routine; (3) interval_length, the length, in some time unit, of each interval; (4) demand_threshold, a multiplicative factor that slightly discounts current resource availability when computing the adequacy of resources for future demand; (5) min_VM, the minimum memory resources needed for provisioning and launching a new VM; and (6) max_VM, the maximum memory resources that can be allocated to a newly provisioned and launched VM.

An enumeration OS 1903 includes a listing of the various types of operating systems run by VMs in the distributed computing system. The type definition time 1904 produces a type time used for the start times of containers and for other purposes. As with all the particular implementation details in this C++-like implementation, various alternative types, constants, constant values, and other such details may be used in alternative implementations. In general, time stamps generated by the distributed system may be integer values that express the number of some time unit, such as milliseconds, seconds, or other time units, that have elapsed since some arbitrary initial time. Alternatively, time stamps may be encoded in date/time formats corresponding to calendar and clock time.

The function wait 1905 causes a routine to wait for an indicated amount of time before resuming execution. No implementation for this routine is provided, since it is highly dependent on platform hardware, choice of virtualization technology, and/or choice of operating system. The routine extrapolate 1906 extrapolates a next data point in a time series of data points by any of various different methods discussed above or by other extrapolation methods. Data-extrapolation routines may be based on simple linear extrapolation, using linear regression, may be based on various types of curve fitting, or may be based on more sophisticated time-sequence-progression estimation techniques. The type definition for the type Ct 1907 is used to store the memory utilization and start time for a container in an array of elements of type Ct that is sorted as part of the method, implemented below in a monitor routine.

Next, four class declarations are provided. In all cases, only the public function-member portions of the declaration are provided, since there are many different, and generally straightforward, ways of implementing these classes. The class Container 1908 represents a container running within the distributed-computing system. Member functions allow for the memory utilization and start time for the container to be extracted from an instance of the class Container, including the member functions getUtilization and getStart, and an == operator, initialization routine, and constructor are also defined for the class Container.

The class VM 1909 represents a virtual machine executing within the distributed-computing system. The class VM includes an == operator, initialization routine, and constructor, like the Container class. In addition, the member functions getUtilization and getConfigured are used to determine the amount of memory utilized by the VM and the amount of configured memory for the VM, respectively. The member function getOS is used to extract an indication of the type of operating system run by the VM. The member function getNumContainers is used to determine the number of containers currently executing within the execution environment provided by the VM. The pair of member functions getFirstContainer and getNextContainer are used to traverse the containers currently executing within the execution environment provided by the VM.

The type definitions for VMptr and Ctptr are provided as convenient types for pointers to instances of the VM and Container classes, respectively 1910. The class set is a generalized class representing a set of objects of type M 1911. The class set includes member functions for adding an element to the set, the pair of member functions first and next, which allow the elements in the set to be traversed, a member function getNum, which returns the number of elements in the set, and the member function in, which returns a Boolean value to indicate whether the reference to an element, supplied as an argument to the function in, is currently contained in the set.

A final declaration is for the class dSystem 1912. This class represents the distributed computing system. The class provides a pair of functions getFirstVM and getNextVM provides a mechanism for traversing the VMs associated with the distributed computing system. In certain implementations, this may mean those VMs currently executing within the distributed-computing system. In other implementations, this may mean both the currently executing VMs as well as any VMs that were executing during some more recent period of time such as, in one example, during the past n time intervals considered by the subsequently described monitoring method. In other words, in order to estimate future demand for container-associated resources, one may consider only the currently executing VMs or one may consider a historical record of all VMs that were executing over a considered previous time period. In many cases, the number of executing VMs in the distributed computing system may be relatively stable, over the considered periods of time, and may generally increase, in which case a historical perspective is unnecessary. In other cases, the number of executing VMs may fluctuate, with demand, over the considered time period, as a result of which a historical perspective provides a better estimate of future demand for resources. Two member functions provision and launch provide for provisioning and launching VMs within the distributed computing system. The member function getCurrentTime is used to obtain a current time stamp from the distributed computing system. The member functions beginMonitor and endMonitor are used, in the subsequently described monitoring routine, to signal beginning of routine execution and ending of routine execution, in case that the distributed computing system wishes to temporarily suspend certain activities while the monitoring routine executes, in order to ensure that the monitoring routine produces a best possible prediction.

FIG. 19C provides implementations for three routines called from the main monitoring routine, discussed below. The routine compare 1913 compares the contents of two Ct data structures, and is used by the standard qsort routine for sorting elements of an array. The routine extrapolate 1914 is probably the simplest possible implementation, which uses only the last two data points of a time sequence of data points to linearly extrapolate a next time point in the sequence. For most implementations, this naïve extrapolation routine would be quite inadequate. As discussed above, a variety of different data-point-extrapolation methods are known, including methods based on linear regression, curve fitting, and even more complicated extrapolation methods. The currently described implementation assumes that an appropriate data-point-extrapolation method is chosen and used in the data-point-extrapolation step of the subsequently described monitoring routine. Finally, a main routine 1915 is provided. This routine comprises a continuously executing while-loop 1916 in which the main routine waits, for a period of time equal to monitoring_period and then calls the monitoring routine monitor. The continuously executing while-loop thus implements periodic monitoring of the configured and utilized memory resources within the distributed-computing system to anticipate a need for additional VMs and, when additional VMs are needed, to provision and launch the VMs so that the required resource capacity is available when new containers are launched.

FIGS. 19D-G show an implementation of the monitor routine monitor. The routine monitor receives a reference to an instance of the class dSystem as argument 1917. A number of variables are declared, in the initial portion of the routine monitor, as shown in FIG. 19D. The sets OSs and VMs 1918 are sets that store indications of the operating-system types and instances of the class VM, respectively. The array sortedCts 1919 stores the Ct data structures that contain the memory utilizations and start times for containers within the distributed-computing system. Local-variable pointers to instances of the VM and Ct classes, v and c, are next declared 1920. The local variables o and as store an indication of an operating-system type and a pointer to an indication of an operating-system type, respectively 1921. The local variable numContainers 1922 is used to count the number of containers currently executing within VMs supporting a particular type of operating system. The variables totalUtilization and totalConfigured 1923 are used to count the total utilization and total configured memory for currently executing VMs that support particular operating systems. Three time local variables 1924 store a current time, the earliest time for which container-associated resources are considered for projecting future demand, and end points of interval_length size periods within the considered time period. The array MbyInterval 1925 stores the computed data points from which a predicted future memory-resource demand is obtained using the extrapolation routine. The local variable mStart 1936 is used to indicate the starting point of computed data points within the array and by interval. Local variables i and j 1927 are used as loop counters. The three variables predictedDemand, available, and VM_size 1928 are used for the predicted resource demand, total available memory resources, and the memory to configure for newly provisioned and launched VMs, respectively.

FIGS. 19E-G shows the actual monitoring-routine logic. At the top of FIG. 19E, a call is made to the routine beginMonitor 1929 to indicate to the distributed-computing system that the resource monitoring is now being carried out by the monitoring routine. Next, the current time is set to a current system time stamp 1930 and the local variable earliestTime is set to the current time minus the length of time represented by n intervals 1931. In an initial statement and following while-loop 1932, the dSystem member functions getFirst and getNext are used to retrieve, from the instance of the dSystem class Sys, either the set of currently executing VMs or a set of VMs currently executing and executing during the considered time interval from earliestTime to currentTime. The VMs are added to VM sets stored in the array VMs, indexed by operating system, and the operating system supported by the VM is added to the set OSs. Thus, following execution of the statement in while-loop 1932, information about the VMs executing on a distributed-computing system and the operating systems supported by these VMs are stored in the set OSs and the array of sets VMs. Note that the sets are true sets, and contain only a single instance of each added element. Next, the local variable os is set to the first operating-system-indication in the set OSs on line 1933 in preparation for execution of the main loop of the monitoring routine. The main loop is a while-loop 1934 that iterates over the operating systems in the set OSs. At the beginning of each iteration, the operating-system indication for the next iteration is stored in local variable o 1935 and the loop variable os is updated 1936. The local variables total Utilization, totalConfigured and numContainers are initialized to 0 1937. Next, in statement 1938 and while-loop 1939, all of the VMs that support the currently considered operating system, represented by instances of the class VM stored in the set VMs[o], are considered in order to create a list of memory utilizations and start times for containers supported by the VMs, with the list stored in the array sortedCts. Only data for containers that were launched during the period of time between the time represented by local variable earliestTime and currentTime.

Turning to FIG. 19F, when no containers are currently being executed by VMs supported the currently considered operating system, then further execution of the current iteration of the main while-loop is terminated 1940 and execution resumes at the beginning of the main loop 1934. Otherwise, Ct data structures representing the containers launched within the considered time period, stored in the array sortedCts are sorted by a quicksort operation 1941. The local variable nextTime is set to the final time in the first time interval within the considered period 1942. In a while-loop 1943, local variable mStart is incremented until the start time of the first container in the array sortedCts falls within the time interval within the considered time period represented by the current value of mStart. Local variable j is set to 0 1944. Local variable j represents the next element of the array sortedCts to be considered in the following for-loop 1945. In for-loop 1945, each data point corresponding to considered time intervals within the considered time period are computed. The data points are stored in the array MbyInterval. During each iteration of the for-loop, the value of the currently considered data point is first initialized to 0 1946. When the index i for the data point is greater than or equal to the current value of mStart, then all of the Ct data structures that include start times less than the final time for the currently considered interval, stored in the local variable nextTime, are used to compute the currently considered data point as the sum of the memory utilized by all of the containers launched within the currently considered time interval, in the inner while-loop 1947. Following execution of for-loop 1945, a next memory-demand or total-memory-utilized data point is predicted or estimated using the extrapolation routine 1948.

FIG. 19G shows the final portion of the monitoring routine. Once the demand for memory associated with containers is estimated for the next time interval, via the extrapolation routine 1948, shown in FIG. 19F, the current memory availability based on the difference between the configured memory and utilized memory for all of the virtual machines supporting the currently considered operating system, is computed and stored in local variable available 1949. When the predicted demand is less than the estimated available memory resource, then the current iteration of the main loop is terminated 1950. Otherwise, the predicted excess demand for the memory resource for containers that will be launched in a next time interval is determined and stored in the local variable predictedDemand 1951. When this predicted demand is less than the minimum memory needed to provision and launch a VM, then a single VM is provisioned and launched with minimal memory 1952. Otherwise, the number of maximally sized VMs needed to cover the predicted demand is computed 1953, the memory that needs to be configured for each of these VMs is then computed 1954, and, in a final inner while-loop 1955, the determined number of VMs with the determined amount of configured memory are provisioned and launched.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate a variety of different implementations of the above-disclosed methods and systems, including choice of native virtualization layers, programming languages, communications protocols, modular organization, data structures, control structures, and other such design and implementation parameters. Any of many different data-point extrapolation routines can be employed. The length of the monitoring period may vary and may, in certain implementations, dynamically vary. Many different types of computational-resource utilization may be monitored concurrently in order to ensure that adequate amounts of the resources are available to allow for launch of containers on demand, without needing to first provision and launch VMs.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A hybrid virtualized distributed computing system comprising:
   multiple host computers, each including
      a hardware layer that includes one or more processors and one or more memories, and
      a virtualization layer that provides an execution environment for one or more virtual machines that each run a guest operating system which in turn, provides an execution environment for an operating-system-level virtualization layer that supports one or more containers, each of which provides an execution environment for one or more applications; and
   an elastic scheduling subsystem that
      monitors, for each type of guest operating system running within one or more virtual machines, utilization and allocation of a computational resource,
      extrapolates a future demand for the computational resource by the containers running within the execution environments pi vided by the guest operating systems of the type of guest operating system based on the utilization and allocation of the computational resource, and
      when the extrapolated demand exceeds a fraction of a remaining available amount of the computational resource allocated to the virtual machines running guest operating. systems of the type of guest operating system,
         provisions and launches one or more additional virtual machines running guest operating systems of the type of operating system to anticipate the extrapolated demand for the computational resource.

2. The hybrid virtualized distributed computing system of claim 1 wherein the utilization and allocation of a computational resource for a type of guest operating system, monitored by the elastic scheduling subsystem, includes:
   the amount of the computational resource configured to currently executing virtual machines running guest operating systems of the type of guest operating system;
   the amount of the computational resource currently utilized by the currently executing virtual machines running guest operating systems of the type of guest operating system; and
   the amount of the computational resource currently utilized by the containers running within the currently executing virtual machines running guest operating systems of the type of guest operating system.

3. The hybrid virtualized distributed computing system of claim 2 wherein the elastic scheduling subsystem determines, for each type of guest operating system, the amount of the computational resource currently utilized by the containers running within the currently executing virtual machines running guest operating systems of the type of guest operating system at a number of time points from the current time back in time to produce a time series of data points.

4. The hybrid virtualized distributed computing system of claim 3 wherein the time series of data points contains data-point values computed only for containers launched within an interval of time corresponding to the data point.

5. The hybrid virtualized distributed computing system of claim 3 wherein the elastic scheduling subsystem extrapolates a future demand for the computational resource by employing a data-point extrapolation method to estimate a next data point in the time series of data points.

6. The hybrid virtualized distributed computing system of claim 5 wherein the data-point extrapolation method is selected from among:
   linear-regression-based data-point extrapolation methods;
   curve-fitting data-point extrapolation methods;
   piecewise linear-regression-based data-point extrapolation methods; and
   piecewise curve-fitting data-point extrapolation methods.

7. The hybrid virtualized distributed computing system of claim 2 wherein the elastic scheduling subsystem determines that the extrapolated demand exceeds a fraction of a remaining available amount of the computational resource allocated to the virtual machines running guest operating systems of the type of guest operating system by:

computing the availability of the computational resource as the difference between the amount of the computational resource configured to currently executing virtual machines running guest operating systems of the type of guest operating system and the amount of the computational resource currently utilized by the currently executing virtual machines running guest operating systems of the type of guest operating system;
multiplying the computed availability by a factor; and
comparing the computed availability to the extrapolated future demand for the computational resource.

8. The hybrid virtualized distributed computing system of claim 2 wherein the elastic scheduling subsystem provisions and launches one or more additional virtual machines running guest operating systems of the type of operating system to anticipate the extrapolated demand for the computational resource by:
computing a need for the computational resource as the computed availability minus the extrapolated future demand;
when the computed need is less than a minimum amount of the computational resource that can be provisioned for a. new virtual machine, provisioning a new virtual machine with the minimum amount of the computational resource and launching the new virtual machine; and
otherwise provisioning one or more new virtual machines with more than the minimum amount of the computational resource and launching the one or more new virtual machines.

9. The hybrid virtualized distributed computing system of claim 8 wherein otherwise provisioning one or more new virtual machines with more than the minimum amount of the computational resource and launching the one or more new virtual machines further comprises:
computing a number of virtual machines to launch as the need divided by the maximum amount of the computational resource that can be provisioned for a. new virtual machine,
when the product of the computed number of virtual machines and the maximum amount of the computational resource is less than the computed need, incrementing the computed number of virtual machines,
computing an allocation size as the computed need divided by the computed number of virtual machines, and
launching a number of new virtual machines equal to the computed number of virtual machines, each configured with an amount of the computational resource equal to the computed allocation size.

10. A method that elastically schedules execution of virtual machines in hybrid virtualized distributed computing system that includes multiple host computers, each including a hardware layer that includes one or more processors and one or more memories and a virtualization layer that provides an execution environment for one or more virtual machines that each run a guest operating system which, in turn, provides an execution environment for an operating-system-level virtualization layer that supports one or more containers, each of which provides an execution environment for one or more applications, the method comprising:
monitoring, for each type of guest operating system running within one or more virtual machines, utilization and allocation of a computational resource,
extrapolating a future demand for the computational resource by the containers running within the execution environments provided by the guest operating systems of the type of guest operating system based on the utilization and allocation of the computational resource, and
when the extrapolated demand exceeds a fraction of a remaining available amount of the computational resource allocated to the virtual machines running guest operating systems of the type of guest operating system,
provisioning and launching one or more additional virtual machines running guest operating systems of the type of operating system to anticipate the extrapolated demand for the computational resource.

11. The method of claim 10 wherein the monitored utilization and allocation of a computational resource for a type of guest operating system includes:
the amount of the computational resource configured to currently executing virtual machines running guest operating systems of the type of guest operating system;
the amount of the computational resource currently utilized by the currently executing virtual machines running guest operating, systems of the type of guest operating system; and
the amount of the computational resource currently utilized by the containers running within the currently executing virtual machines running guest operating systems of the type of guest operating system.

12. The method of claim 11 further including determining, for each type of guest operating system, the amount of the computational resource currently utilized by the containers running within the currently executing virtual machines limning guest operating systems of the type of guest operating system at a number of time points from the current time back in time to produce a time series of data points.

13. The method of claim 12 wherein the time series of data points contains data-point values computed only for containers launched within an interval of time corresponding to the data point.

14. The method of claim 13 wherein extrapolating a future demand for the computational resource further comprises employing a data-point extrapolation method to estimate a next data point in the time series of data points.

15. The method of claim 14 wherein the data-point extrapolation method is selected from among:
linear-regression-based data-point extrapolation methods;
curve-fitting data-point extrapolation methods;
piecewise linear-regression-based data-point extrapolation methods; and
piecewise curve-fitting data-point extrapolation methods.

16. The method of claim 11 wherein determining that the extrapolated demand exceeds a fraction of a remaining available amount of the computational resource allocated to the virtual machines running guest operating systems of the type of guest operating system further comprises:
computing the availability of the computational resource as the difference between the amount of the computational resource configured to currently executing virtual machines running guest operating systems of the type of guest operating system and the amount of the computational resource currently utilized by the currently executing virtual machines running guest operating systems of the type of guest operating system;
multiplying the computed availability by a factor; and
comparing the computed availability to the extrapolated future demand for the computational resource.

17. The method of claim 11 wherein provisioning and launching one or more additional virtual machines running guest operating systems of the type of operating system to anticipate the extrapolated demand for the computational resource further comprises:

computing a need for the computational resource as the computed availability minus the extrapolated future demand;

when the computed need is less than a minimum amount of the computational resource that can be provisioned for a new virtual machine, provisioning a new virtual machine with the minimum amount of the computational resource and launching the new virtual machine and otherwise provisioning one or more new virtual machines with more than the minimum amount of the computational resource and launching the one or more new virtual machines.

18. The method of claim 17 wherein otherwise provisioning one or more new virtual machines with more than the minimum amount of the computational resource and launching the one or more new virtual machines further comprises:

computing a number of virtual machines to launch as the need divided by the maximum amount of the computational resource that can be provisioned for a new virtual machine, when the product of the computed number of virtual machines and the maximum amount of the computational resource is less than the computed need, incrementing the computed number of virtual machines, computing an allocation size as the computed need divided by the computed number of virtual machines, and launching a number of new virtual machines equal to the computed number of virtual machines, each configured with an amount of the computational resource equal to the computed allocation size.

19. A physical data-storage device that stores computer instructions that implement a method that elastically schedules execution of virtual machines in hybrid virtualized distributed computing system that includes multiple host computers, each including a hardware layer that includes one or more processors and one or more memories and a virtualization layer that provides an execution environment for one or more virtual machines that each run a guest operating system which, in turn, provides an execution environment for an operating-system-level virtualization layer that supports one or more containers, each of which provides an execution environment for one or more applications, the method comprising:

monitoring, for each type of guest operating system running within one or more virtual machines, utilization and allocation of a computational resource, extrapolating a future demand for the computational resource by the containers running within the execution environments provided by the guest operating systems of the type of guest operating system based on the utilization and allocation of the computational resource, and when the extrapolated demand exceeds a fraction of a remaining available amount of the computational resource allocated to the virtual machines running guest operating systems of the type of guest operating system, provisioning and launching one or more additional virtual machines running guest operating systems of the type of operating system to anticipate the extrapolated demand for the computational resource.

20. The physical data-storage device of claim 10 wherein the monitored utilization and allocation of a computational resource for a type of guest operating system includes:

the amount of the computational resource configured to currently executing virtual machines running guest operating systems of the type of guest operating system;

the amount of the computational resource currently utilized by the currently executing virtual machines running guest operating systems of the type of guest operating system; and the amount of the computational resource currently utilized by the containers running within the currently executing virtual machines running guest operating systems of the type of guest operating system.

\* \* \* \* \*